(12) United States Patent
Kitaguchi et al.

(10) Patent No.: US 9,520,242 B2
(45) Date of Patent: Dec. 13, 2016

(54) ELECTRICAL STORAGE DEVICE ELECTRODE BINDER COMPOSITION, ELECTRICAL STORAGE DEVICE ELECTRODE SLURRY, ELECTRICAL STORAGE DEVICE ELECTRODE, AND ELECTRICAL STORAGE DEVICE

(71) Applicant: JSR CORPORATION, Minato-ku (JP)

(72) Inventors: Hironori Kitaguchi, Yokkaichi (JP); Yoshiharu Otsuka, Yokkaichi (JP); Nobuyuki Fujihara, Yokkaichi (JP); Tatsuaki Honda, Yokkaichi (JP)

(73) Assignee: JSR CORPORATION, Minato-ku (JP)

( * ) Notice: Subject to any disclaimer, the term of this patent is extended or adjusted under 35 U.S.C. 154(b) by 0 days.

(21) Appl. No.: 14/679,431

(22) Filed: Apr. 6, 2015

(65) Prior Publication Data

US 2015/0213968 A1    Jul. 30, 2015

Related U.S. Application Data

(62) Division of application No. 13/599,288, filed on Aug. 30, 2012, now abandoned.

(30) Foreign Application Priority Data

Aug. 30, 2011    (JP) ................. 2011-187498

(51) Int. Cl.
*C08L 27/24*      (2006.01)
*H01G 9/00*       (2006.01)
(Continued)

(52) U.S. Cl.
CPC .............. *H01G 11/38* (2013.01); *H01G 11/04* (2013.01); *H01G 11/28* (2013.01); *H01G 11/30* (2013.01);
(Continued)

(58) Field of Classification Search
None
See application file for complete search history.

(56) References Cited

U.S. PATENT DOCUMENTS 5,349,003 A  *  9/1994   Kato et al. .................... 524/458
6,200,703 B1 *  3/2001   Kashio ..................... C08K 3/24
                                                                   429/217
(Continued)

FOREIGN PATENT DOCUMENTS

CN          101550322          10/2009
EP          2 463 943 A1        6/2012
(Continued)

OTHER PUBLICATIONS

U.S. Appl. No. 14/427,233, filed Mar. 10, 2015, Katsuda, et al.
Extended European Search Report issued Sep. 14, 2012, in Patent Application No. 12172997.4.

*Primary Examiner* — Ula C Ruddock
*Assistant Examiner* — Amanda Barrow
(74) *Attorney, Agent, or Firm* — Oblon, McClelland, Maier & Neustadt, L.L.P.

(57) ABSTRACT

An electrode binder composition that is used to produce an electrode used for an electrical storage device, includes (A) a polymer, (B) a carboxylic acid or a salt thereof, and (C) a liquid medium, and has a concentration of the carboxylic acid or a salt thereof (B) of 20 to 1000 ppm.

20 Claims, 1 Drawing Sheet

(51) Int. Cl.
*C08K 5/098* (2006.01)
*C08L 47/00* (2006.01)
*C08K 5/09* (2006.01)
*H01M 4/62* (2006.01)
*H01M 4/36* (2006.01)
*C08K 5/092* (2006.01)
*B82Y 30/00* (2011.01)
*H01G 11/38* (2013.01)
*H01M 4/13* (2010.01)
*H01M 4/139* (2010.01)
*H01M 4/88* (2006.01)
*H01M 10/0525* (2010.01)
*H01G 11/30* (2013.01)
*H01G 11/04* (2013.01)
*H01G 11/28* (2013.01)
*H01G 11/62* (2013.01)

(52) U.S. Cl.
CPC ............... *H01G 11/62* (2013.01); *H01M 4/13* (2013.01); *H01M 4/139* (2013.01); *H01M 4/622* (2013.01); *H01M 4/623* (2013.01); *H01M 4/8828* (2013.01); *H01M 10/0525* (2013.01); *Y02E 60/122* (2013.01); *Y02E 60/13* (2013.01); *Y02E 60/50* (2013.01)

(56) References Cited

U.S. PATENT DOCUMENTS

| | | | |
|---|---|---|---|
| 8,513,349 B2 | 8/2013 | Ootsuka et al. | |
| 8,663,839 B2 | 3/2014 | Maegawa et al. | |
| 8,709,652 B2 | 4/2014 | Maegawa et al. | |
| 2006/0046147 A1* | 3/2006 | Nakai et al. | 429/235 |
| 2006/0134520 A1* | 6/2006 | Ishii | H01M 2/22 429/223 |
| 2011/0143214 A1* | 6/2011 | Monahov | H01M 4/62 429/324 |
| 2011/0176255 A1* | 7/2011 | Sasaki et al. | 361/502 |
| 2012/0264878 A1* | 10/2012 | Matsuyama | C08F 265/00 524/850 |
| 2012/0309892 A1* | 12/2012 | Ootsuka et al. | 524/546 |
| 2013/0286545 A1* | 10/2013 | Kojima et al. | 361/528 |
| 2013/0323588 A1 | 12/2013 | Kajiwara et al. | |
| 2014/0038041 A1* | 2/2014 | Kajiwara et al. | 429/211 |
| 2014/0217322 A1 | 8/2014 | Yamada et al. | |
| 2014/0272523 A1 | 9/2014 | Otsuka et al. | |
| 2015/0187516 A1 | 7/2015 | Miyauchi et al. | |

FOREIGN PATENT DOCUMENTS

| | | | | |
|---|---|---|---|---|
| JP | 11-025989 | * | 1/1999 | ............ H01M 4/62 |
| JP | 2000-299109 | * | 10/2000 | ............ H01M 4/62 |
| JP | 2002-042819 | | 2/2002 | |
| JP | 2010-003703 | | 1/2010 | |
| JP | 2010-055847 | | 3/2010 | |
| JP | 2010-205722 | | 9/2010 | |
| JP | 2011-003529 | | 1/2011 | |
| WO | WO 00/49103 | * | 8/2000 | ............ C09J 127/16 |
| WO | WO 2011/016563 A1 | | 2/2011 | |
| WO | 2011/077500 A1 | | 6/2011 | |
| WO | WO 2011/077500 | * | 6/2011 | ............ H01M 4/62 |
| WO | WO 2012/086340 | * | 6/2012 | ............ H01G 9/058 |
| WO | WO 2012/111472 | * | 8/2012 | ............ H01M 4/13 |

* cited by examiner

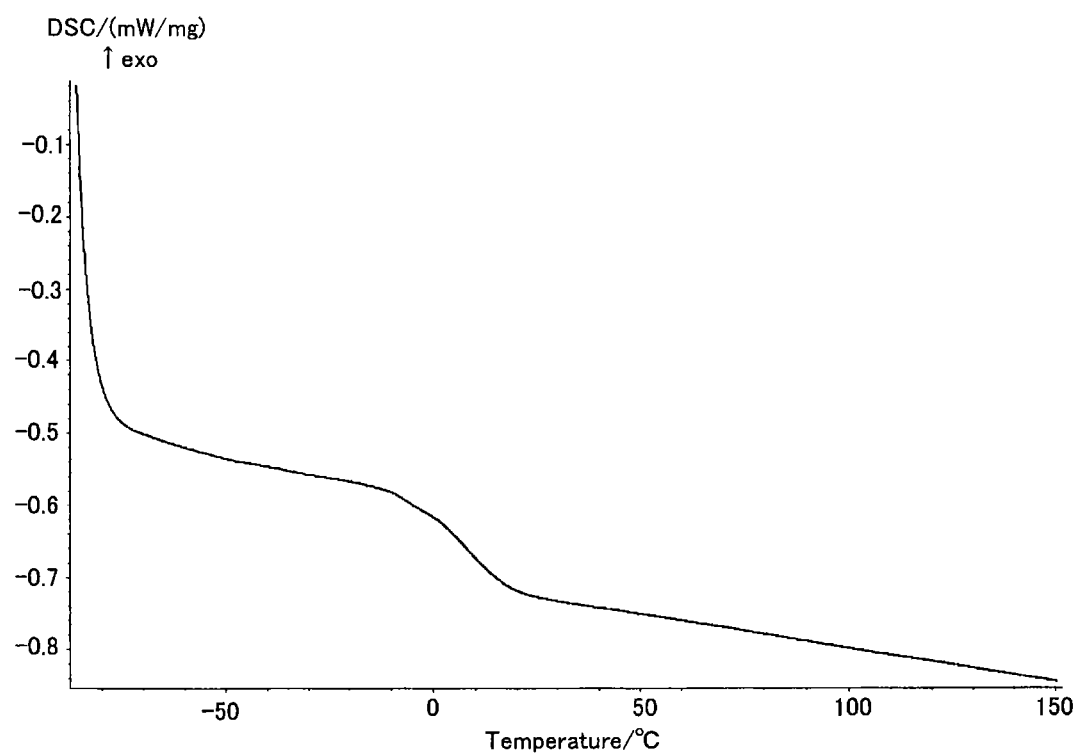

ELECTRICAL STORAGE DEVICE ELECTRODE BINDER COMPOSITION, ELECTRICAL STORAGE DEVICE ELECTRODE SLURRY, ELECTRICAL STORAGE DEVICE ELECTRODE, AND ELECTRICAL STORAGE DEVICE

This application is a Divisional of U.S. application Ser. No. 13/599,288, filed on Aug. 30, 2012, which claims benefit to Japanese Patent Application No. 2011-187498 filed on Aug. 30, 2011, which is hereby incorporated by reference in its entirety.

BACKGROUND OF THE INVENTION

The present invention relates to an electrical storage device electrode binder composition, an electrical storage device electrode slurry that includes the binder composition and an electrode active material, an electrical storage device electrode that is produced by applying the slurry to a collector, and an electrical storage device that includes the electrode.

In recent years, a high-voltage electrical storage device having a high energy density has been desired as a power supply for driving an electronic instrument. In particular, a lithium-ion battery or a lithium-ion capacitor is expected to be a high-voltage electrical storage device having a high energy density.

An electrode used for such an electrical storage device is produced by applying a mixture of an electrode active material and polymer particles that function as an electrode binder to the surface of a collector, and drying the mixture. The polymer particles are required to exhibit a capability of binding the electrode active material, a capability of binding the electrode active material and the collector, scratch resistance when winding the electrode, and powder fall resistance (i.e., a fine powder of the electrode active material or the like does not occur from an electrode composition layer (hereinafter may be referred to as "electrode active material layer") due to cutting or the like). If the polymer particles satisfy these properties, it is possible to produce an electrical storage device that has high flexibility in structural design (e.g., an electrode folding method or an electrode winding radius), and can be reduced in size. It was found that a capability of binding the electrode active material, a capability of binding the electrode active material and the collector, and the powder fall resistance have an almost proportional relationship. Therefore, these properties may be comprehensively referred to as "adhesion".

When producing a positive electrode, it is advantageous to use a fluorine-containing organic polymer (e.g., polyvinylidene fluoride (PVDF)) that exhibits slightly poor adhesion, but exhibits excellent oxidation resistance. When producing a negative electrode, it is advantageous to use a (meth)acrylic acid polymer that exhibits slightly poor oxidation resistance, but exhibits excellent adhesion.

Various techniques have been studied and proposed in order to improve the properties (e.g., oxidation resistance and adhesion) of a polymer that is used for the electrode binder. For example, JP-A-2011-3529 proposes a technique that provides a negative electrode binder with oxidation resistance and adhesion by utilizing PVDF and a rubber polymer in combination. JP-A-2010-55847 proposes a technique that improves adhesion by dissolving PVDF in a specific organic solvent, applying the solution to the surface of a collector, and removing the organic solvent at a low temperature. JP-A-2002-42819 proposes a technique that improves adhesion by utilizing an electrode binder having a structure that includes a main chain formed of a vinylidene fluoride copolymer and a side chain that includes a fluorine atom.

A technique that improves the above properties by controlling the composition of a binder (see JP-A-2000-299109), and a technique that improves the above properties by utilizing an epoxy or hydroxyl group-containing binder (see JP-A-2010-205722 and JP-A-2010-3703), have also been proposed.

The negative electrode binder disclosed in JP-A-2011-3529 that utilizes a fluorine-containing organic polymer and a rubber polymer exhibits improved adhesion, but the oxidation resistance of the organic polymer deteriorates to a large extent. Therefore, an electrical storage device produced using the negative electrode binder has a problem in that the charge-discharge characteristics irreversibly deteriorate due to repeated charge-discharge cycles. The electrode binder disclosed in JP-A-2010-55847 or JP-A-2002-42819 that utilizes only a fluorine-containing organic polymer cannot achieve sufficient adhesion.

The binder composition disclosed in JP-A-2000-299109 or JP-A-2010-205722 exhibits improved adhesion. However, it is difficult to maintain good charge-discharge characteristics for a long time since the binder that adheres to the electrode active material functions as a resistance component of the electrode.

These electrode binder compositions are merely evaluated in terms of the properties of an electrical storage device, and the storage stability of the electrode binder compositions that is important for practical use has not been studied.

SUMMARY

The invention may solve the above problems, and may provide an electrical storage device electrode binder composition that exhibits excellent storage stability, and can produce an electrode that exhibits excellent adhesion and charge-discharge characteristics.

According to a first aspect of the invention, there is provided an electrical storage device electrode binder composition that is used to produce an electrode used for an electrical storage device, the binder composition including (A) a polymer, (B) a carboxylic acid or a salt thereof, and (C) a liquid medium, the polymer (A) being polymer alloy particles formed of an interpenetrating polymer network (IPN) that includes (Aa) a polymer that includes a repeating unit derived from at least one compound selected from a group consisting of vinylidene fluoride, tetrafluoroethylene, and hexafluoropropylene, and (Ab) a polymer that includes a repeating unit derived from an unsaturated carboxylic acid ester, the polymer (Aa) and the polymer (Ab) not being covalently bonded, and the binder composition having a concentration of the carboxylic acid or a salt thereof (B) of 20 to 1000 ppm.

According to a second aspect of the invention, there is provided an electrical storage device electrode binder composition that is used to produce an electrode used for an electrical storage device, the binder composition including (A) a polymer, (B) a carboxylic acid or a salt thereof, and (C) a liquid medium, the polymer (A) being diene polymer particles that include (a) a repeating unit derived from a conjugated diene compound, (b) a repeating unit derived from an aromatic vinyl compound, (c) a repeating unit derived from a (meth)acrylate compound, and (d) a repeating unit derived from an unsaturated carboxylic acid, and the binder composition having a concentration of the carboxylic acid or a salt thereof (B) of 20 to 1000 ppm.

According to a third aspect of the invention, there is provided an electrical storage device electrode slurry including the electrical storage device electrode binder composition, and an electrode active material.

According to a fourth aspect of the invention, there is provided an electrical storage device electrode including a collector, and a layer that is formed by applying the electrical storage device electrode slurry to a surface of the collector, and drying the slurry.

According to a fifth aspect of the invention, there is provided an electrical storage device including the electrical storage device electrode.

BRIEF DESCRIPTION OF THE SEVERAL VIEWS OF THE DRAWING

FIG. 1 illustrates the DSC chart of the polymer particles obtained in Example 3.

DETAILED DESCRIPTION OF THE EMBODIMENT

The invention was conceived in order to solve at least some of the above problems, and may be implemented as follows.

Application Example 1

According to one embodiment of the invention, there is provided an electrical storage device electrode binder composition that is used to produce an electrode used for an electrical storage device, the binder composition including (A) a polymer, (B) a carboxylic acid or a salt thereof, and (C) a liquid medium, the polymer (A) being polymer alloy particles formed of an interpenetrating polymer network (IPN) that includes (Aa) a polymer that includes a repeating unit derived from at least one compound selected from a group consisting of vinylidene fluoride, tetrafluoroethylene, and hexafluoropropylene, and (Ab) a polymer that includes a repeating unit derived from an unsaturated carboxylic acid ester, the polymer (Aa) and the polymer (Ab) not being covalently bonded, and the binder composition having a concentration of the carboxylic acid or a salt thereof (B) of 20 to 1000 ppm.

Application Example 2

In the electrical storage device electrode binder composition according to Application Example 1, the polymer alloy particles may have only one endothermic peak within a temperature range of −50 to +250° C. when subjected to differential scanning calorimetry (DSC) in accordance with JIS K 7121.

Application Example 3

In the electrical storage device electrode binder composition according to Application Example 2, the polymer alloy particles may have the only one endothermic peak within a temperature range of −30 to +30° C.

Application Example 4

In the electrical storage device electrode binder composition according to Application Example 1, the polymer alloy particles may include the polymer (Aa) in an amount of 1 to 60 parts by mass based on 100 parts by mass of the polymer alloy particles.

Application Example 5

In the electrical storage device electrode binder composition according to Application Example 1, the polymer alloy particles may have a number average particle size of 50 to 400 nm.

Application Example 6

According to another embodiment of the invention, there is provided an electrical storage device electrode binder composition that is used to produce an electrode used for an electrical storage device, the binder composition including (A) a polymer, (B) a carboxylic acid or a salt thereof, and (C) a liquid medium, the polymer (A) being diene polymer particles that include (a) a repeating unit derived from a conjugated diene compound, (b) a repeating unit derived from an aromatic vinyl compound, (c) a repeating unit derived from a (meth)acrylate compound, and (d) a repeating unit derived from an unsaturated carboxylic acid, and the binder composition having a concentration of the carboxylic acid or a salt thereof (B) of 20 to 1000 ppm.

Application Example 7

In the electrical storage device electrode binder composition according to Application Example 6, the diene polymer particles may have only one endothermic peak within a temperature range of −50 to +5° C. when subjected to differential scanning calorimetry (DSC) in accordance with JIS K 7121.

Application Example 8

In the electrical storage device electrode binder composition according to Application Example 6, the diene polymer particles may have a number average particle size of 50 to 400 nm.

Application Example 9

According to another embodiment of the invention, there is provided an electrical storage device electrode slurry including the electrical storage device electrode binder composition according to Application Example 1, and an electrode active material.

Application Example 10

According to another embodiment of the invention, there is provided an electrical storage device electrode slurry including the electrical storage device electrode binder composition according to Application Example 6, and an electrode active material.

Application Example 11

According to another embodiment of the invention, there is provided an electrical storage device electrode including a collector, and a layer that is formed by applying the electrical storage device electrode slurry according to Application Example 9 to a surface of the collector, and drying the slurry.

Application Example 12

According to another embodiment of the invention, there is provided an electrical storage device electrode including a collector, and a layer that is formed by applying the electrical storage device electrode slurry according to Application Example 10 to a surface of the collector, and drying the slurry.

Application Example 13

According to another embodiment of the invention, there is provided an electrical storage device including the electrical storage device electrode according to Application Example 11.

Application Example 14

According to another embodiment of the invention, there is provided an electrical storage device including the electrical storage device electrode according to Application Example 12.

The electrode binder composition exhibits excellent storage stability, and can produce an electrode that exhibits excellent adhesion and excellent charge-discharge characteristics. An electrical storage device that includes an electrode produced using the electrode binder composition has excellent charge-discharge rate characteristics (i.e., electrical characteristics).

Preferred embodiments of the invention are described in detail below. Note that the invention is not limited to the following embodiments. It should be understood that the invention includes various modifications that may be practiced without departing from the scope of the invention. The term "(meth)acrylic acid" used herein refers to "acrylic acid" and "methacrylic acid". The term "(meth)acrylate" used herein refers to "acrylate" and "methacrylate".

1. ELECTRICAL STORAGE DEVICE ELECTRODE BINDER COMPOSITION

An electrical storage device electrode binder composition (hereinafter referred to as "electrode binder composition") according to one embodiment of the invention is used to produce an electrode used for an electrical storage device, includes (A) a polymer, (B) a carboxylic acid or a salt thereof, and (C) a liquid medium, and has a concentration of the carboxylic acid or a salt thereof (B) of 20 to 1000 ppm. Each component of the electrode binder composition according to one embodiment of the invention is described in detail below.

1.1. Polymer (A)

The polymer (A) included in the electrode binder composition according to one embodiment of the invention may be dissolved in the liquid medium (C), or may be dispersed in the liquid medium (C) in the form of particles (i.e., latex). It is preferable that the polymer (A) be dispersed in the liquid medium (C) in the form of particles. The polymer (A) that is dispersed in the liquid medium (C) in the form of particles is hereinafter referred to as "polymer particles (A)". When the electrode binder composition is a latex, an electrode slurry prepared by mixing the electrode binder composition with an electrode active material exhibits good stability and excellent applicability to a collector.

Commercially available latex particles may be used as the polymer particles (A). When using the electrode binder composition according to one embodiment of the invention to produce a positive electrode, the polymer particles (A) are preferably polymer alloy particles. When using the electrode binder composition according to one embodiment of the invention to produce a negative electrode, the polymer particles (A) are preferably diene polymer particles.

1.1.1. Polymer Alloy Particles

When using the electrode binder composition according to one embodiment of the invention to produce a positive electrode, it is preferable that the polymer particles (A) be polymer alloy particles. It is preferable that the polymer alloy particles include (Aa) a polymer that includes a repeating unit derived from at least one compound selected from a group consisting of vinylidene fluoride, tetrafluoroethylene, and hexafluoropropylene, and (Ab) a polymer that includes a repeating unit derived from an unsaturated carboxylic acid ester.

The term "polymer alloy" is defined in *Iwanami Rikagaku Jiten* (5th ed., Iwanami Shoten, Publishers) as "a general name of multi-component polymers that are obtained by mixing or chemically bonding two or more polymers". The term "polymer alloy" defined in *Iwanami Rikagaku Jiten* refers to "a polymer blend in which different polymers are physically mixed, a block or graft copolymer in which different polymer components are covalently bonded, a polymer complex in which different polymers are associated due to an intermolecular force, an interpenetrating polymer network (IPN) in which different polymers are entangled, and the like". Note that the polymer alloy particles included in the electrode binder composition according to the invention are formed of an interpenetrating polymer network (IPN) in which different polymer components are not covalently bonded.

It is considered that hard segments formed of a crystalline resin aggregate in the polymer (Aa) that forms the polymer alloy particles to form a pseudo crosslinking point (e.g., C—H . . . F—C) in the main chain. Therefore, when the polymer (Aa) is used alone as a binder resin, the binder resin exhibits insufficient adhesion and flexibility in spite of excellent oxidation resistance. On the other hand, the polymer (Ab) that forms the polymer alloy particles exhibits excellent adhesion and flexibility, but exhibits poor oxidation resistance. Therefore, when the polymer (Ab) is used alone as a binder resin when forming a positive electrode, oxidative decomposition occurs due to repeated charge-discharge cycles, and excellent charge-discharge characteristics cannot be obtained.

It was found that a positive electrode that exhibits oxidation resistance and adhesion at the same time while exhibiting excellent charge-discharge characteristics can be produced using polymer alloy particles that include the polymer (Aa) and the polymer (Ab). Note that the oxidation resistance can be further improved when the polymer alloy particles include the polymer (Aa) and the polymer (Ab).

It is preferable that the polymer alloy particles have only one endothermic peak within a temperature range of −50 to +250° C. when subjected to differential scanning calorimetry (DSC) in accordance with JIS K 7121. It is more preferable that the polymer alloy particles have the only one endothermic peak within a temperature range of −30 to +30° C.

The polymer (Aa) that forms the polymer alloy particles normally has an endothermic peak (melting temperature) at −50 to +250° C. The polymer (Ab) that forms the polymer alloy particles normally has an endothermic peak (glass transition temperature) that is different from that of the polymer (Aa). Therefore, when the polymer (Aa) and the polymer (Ab) are present in the particles in a phase separation state (e.g., as a core-shell structure), two endothermic peaks are detected within a temperature range of −50 to +250° C. When the particles have only one endothermic peak within a temperature range of −50 to +250° C., it is considered that the particles are polymer alloy particles.

When the polymer alloy particles have the only one endothermic peak within a temperature range of −30 to +30° C., the polymer alloy particles provide excellent flexibility and tackiness to an electrode active material layer, and further improve the adhesion of the electrode active material layer.

1.1.1.1. Polymer (Aa)

The polymer (Aa) includes a repeating unit derived from at least one compound selected from the group consisting of vinylidene fluoride, tetrafluoroethylene, and hexafluoropropylene. A fluoropolymer component such as the polymer (Aa) is generally considered to exhibit excellent oxidation resistance, and may be used for a positive electrode binder composition. However, such a fluoropolymer component exhibits poor adhesion. Therefore, various attempts have been made to improve the adhesion of a fluoropolymer through modification. For example, an attempt to improve the adhesion of a fluoropolymer by introducing a functional group into the polymer chain is difficult to achieve since this requires accurately controlling the polymer synthesis conditions.

The invention achieves an improvement in adhesion without causing a deterioration in oxidation resistance by utilizing the polymer alloy particles that include the polymer (Aa) together with the polymer (Ab).

The polymer (Aa) may include a repeating unit derived from an additional copolymerizable unsaturated monomer other than vinylidene fluoride, tetrafluoroethylene, and hexafluoropropylene. Examples of the additional unsaturated monomer include a (meth)acrylate, an aromatic vinyl compound, a vinyl ester of a carboxylic acid, a halogenated olefin, a conjugated diene compound, an alpha-olefin, and the like. The additional unsaturated monomer may be one or more compounds selected from these compounds.

The content of the repeating unit derived from at least one compound selected from vinylidene fluoride, tetrafluoroethylene, and hexafluoropropylene in the polymer (Aa) is preferably 80 mass % or more, and more preferably 90 mass % or more, based on the total mass of the polymer (Aa).

The content of the repeating unit derived from vinylidene fluoride in the polymer (Aa) is preferably 50 to 99 mass %, and more preferably 80 to 98 mass %. The content of the repeating unit derived from tetrafluoroethylene in the polymer (Aa) is preferably 1 to 50 mass %, and more preferably 2 to 20 mass %. The content of the repeating unit derived from hexafluoropropylene in the polymer (Aa) is preferably 1 to 50 mass %, and more preferably 2 to 20 mass %.

The polymer (Aa) may be easily produced by subjecting at least one unsaturated monomer selected from vinylidene fluoride, tetrafluoroethylene, and hexafluoropropylene, and an optional additional unsaturated monomer other than vinylidene fluoride, tetrafluoroethylene, and hexafluoropropylene to emulsion polymerization according to a known method.

1.1.1.2. Polymer (Ab)

The polymer (Ab) includes a repeating unit derived from an unsaturated carboxylic acid ester. A component such as the polymer (Ab) has not been used to produce a positive electrode since such a component has been considered to exhibit excellent adhesion, but exhibit poor oxidation resistance. The invention successfully achieves sufficient oxidation resistance while maintaining excellent adhesion by utilizing the polymer alloy particles that include the polymer (Aa) together with the polymer (Ab). It is preferable to use (meth)acrylate as the unsaturated carboxylic acid ester that produces the repeating unit included in the polymer (Ab).

Specific examples of the (meth)acrylate include methyl (meth)acrylate, ethyl (meth)acrylate, n-propyl (meth)acrylate, i-propyl (meth)acrylate, n-butyl (meth)acrylate, i-butyl (meth)acrylate, n-amyl (meth)acrylate, i-amyl (meth)acrylate, hexyl (meth)acrylate, cyclohexyl (meth)acrylate, 2-ethylhexyl (meth)acrylate, n-octyl (meth)acrylate, nonyl (meth)acrylate, decyl (meth)acrylate, hydroxymethyl (meth)acrylate, hydroxyethyl (meth)acrylate, ethylene glycol (meth)acrylate, ethylene glycol di(meth)acrylate, propylene glycol di(meth)acrylate, trimethylolpropane tri(meth)acrylate, pentaerythritol tetra(meth)acrylate, dipentaerythritol hexa(meth)acrylate, allyl (meth)acrylate, ethylene di(meth)acrylate, and the like. The (meth)acrylate may be one or more compounds selected from these compounds. It is preferable to use one or more (meth)acrylates selected from methyl (meth)acrylate, ethyl (meth)acrylate, and 2-ethylhexyl (meth)acrylate It is particularly preferable to use methyl (meth)acrylate.

The polymer (Ab) may include only a repeating unit derived from an unsaturated carboxylic acid ester, or may include a structural unit derived from an additional copolymerizable unsaturated monomer in addition to the repeating unit derived from an unsaturated carboxylic acid ester.

The content of the repeating unit derived from an unsaturated carboxylic acid ester in the polymer (Ab) is preferably 65 mass % or more, and more preferably 75 mass % or more, based on the total mass of the polymer (Ab).

Examples of the additional unsaturated monomer include an alpha,beta-unsaturated nitrile compound, an unsaturated carboxylic acid, a conjugated diene compound, an aromatic vinyl compound, and the like.

1.1.1.3. Production of Polymer Alloy Particles

The polymer alloy particles may be synthesized by an arbitrary method so long as the resulting polymer alloy particles have the above configuration. For example, the polymer alloy particles may be easily synthesized by a known emulsion polymerization method or a combination of known emulsion polymerization methods.

For example, the polymer (Aa) that includes a repeating unit derived from at least one compound selected from the group consisting of vinylidene fluoride, tetrafluoroethylene, and hexafluoropropylene is synthesized by a known method. Then, monomers used to produce the polymer (Ab) are added to the polymer (Aa), and sufficiently absorbed in the network structure of the polymer (Aa). The monomers are polymerized in the network structure of the polymer (Aa) to synthesize the polymer (Ab). The polymer alloy particles can thus be easily produced. When producing the polymer alloy particles by the above method, the monomers that produce the polymer (Ab) must be sufficiently absorbed in the polymer (Aa). If the absorption temperature is too low, or the absorption time is too short, core-shell particles or particles in which part of the surface layer has an IPN structure may be produced (i.e., the polymer alloy particles used in the invention may not be obtained). If the absorption temperature is too high, the pressure in the polymerization system may increase to a large extent, resulting in difficulties in handling the reaction system and controlling the reaction. Even if the absorption time is increased to a large extent, further advantageous results may not be obtained.

The absorption temperature is preferably 30 to 100° C., and more preferably 40 to 80° C. The absorption time is preferably 1 to 12 hours, and more preferably 2 to 8 hours. When the absorption temperature is low, it is preferable to increase the absorption time. When the absorption temperature is high, a short absorption time is sufficient. It is preferable to employ conditions where a value obtained by multiplying the absorption temperature (° C.) by the absorption time (h) is about 120 to about 300 (° C.·h), and preferably 150 to 250 (° C.·h).

It is preferable that the monomers that produce the polymer (Ab) be absorbed in the network structure of the polymer (Aa) in a known solvent (e.g., water) that is used for emulsion polymerization.

The polymer alloy particles preferably include the polymer (Aa) in an amount of 1 to 60 parts by mass, more preferably 5 to 55 parts by mass, still more preferably 10 to 50 parts by mass, and particularly preferably 20 to 40 parts by mass, based on 100 parts by mass of the polymer alloy particles. If the polymer alloy particles include the polymer (Aa) in an amount within the above range, the balance between oxidation resistance and adhesion is improved.

The polymer alloy particles may be produced (i.e., polymerization of the polymer (Aa) and/or polymerization of the polymer (Ab) performed in a state in which the monomers are absorbed in the polymer (Aa)) in the presence of a known emulsifier (surfactant), initiator, molecular weight modifier, and the like (described below).

1.1.2. Diene Polymer Particles

When using the electrode binder composition according to one embodiment of the invention to produce a negative electrode, it is preferable that the polymer particles (A) be diene polymer particles. The diene polymer particles preferably include (a) a repeating unit derived from a conjugated diene compound, (b) a repeating unit derived from an aromatic vinyl compound, (c) a repeating unit derived from a (meth)acrylate compound, and (d) a repeating unit derived from an unsaturated carboxylic acid.

1.1.2.1. Repeating Unit (a) Derived from Conjugated Diene Compound

When the polymer (A) includes the repeating unit (a) derived from a conjugated diene compound, a negative electrode binder composition that exhibits excellent viscoelasticity and strength can be easily prepared. Specifically, a polymer that includes a repeating unit derived from a conjugated diene compound exhibits a high binding capability. Since the rubber elasticity due to the conjugated diene compound is provided to the polymer, the polymer can follow a change in volume of an electrode. It is considered that the polymer is thus provided with an improved binding capability, and durability that maintains charge-discharge characteristics for a long time.

Examples of the conjugated diene compound include 1,3-butadiene, 2-methyl-1,3-butadiene, 2,3-dimethyl-1,3-butadiene, 2-chloro-1,3-butadiene, and the like. The conjugated diene compound may be one or more compounds selected from these compounds. It is particularly preferable to use 1,3-butadiene as the conjugated diene compound.

The polymer (A) preferably includes the repeating unit (a) derived from a conjugated diene compound in an amount of 30 to 60 parts by mass, and more preferably 40 to 55 parts by mass, based on 100 parts by mass of the total structural units. If the polymer (A) includes the repeating unit (a) in an amount within the above range, adhesion (binding capability) is further improved.

1.1.2.2. Repeating Unit (b) Derived from Aromatic Vinyl Compound

When the polymer (A) includes the repeating unit (b) derived from an aromatic vinyl compound, the polymer (A) exhibits excellent affinity to a conductivity-imparting agent included in a negative electrode slurry.

Specific examples of the aromatic vinyl compound include styrene, alpha-methylstyrene, p-methylstyrene, vinyltoluene, chlorostyrene, divinylbenzene, and the like. The aromatic vinyl compound may be one or more compounds selected from these compounds. It is particularly preferable to use styrene as the aromatic vinyl compound.

The polymer (A) preferably includes the repeating unit (b) derived from an aromatic vinyl compound in an amount of 10 to 40 parts by mass, and more preferably 15 to 30 parts by mass, based on 100 parts by mass of the total repeating units. If the polymer (A) includes the repeating unit (b) in an amount within the above range, the polymer particles exhibit moderate adhesion to graphite that may be used as an electrode active material. Moreover, an electrode layer that is formed using the polymer (A) exhibits excellent flexibility and good adhesion to a collector.

1.1.2.3. Repeating Unit (c) Derived from (Meth)Acrylate Compound

When the polymer (A) includes the repeating unit (c) derived from a (meth)acrylate compound, the polymer (A) exhibits good affinity to an electrolyte. This makes it possible to suppress an increase in internal resistance that may occur when the binder serves as sn electrical resistance component in the battery. It is also possible to prevent a decrease in adhesion due to excessive absorption of the electrolyte.

Specific examples of the (meth)acrylate compound include methyl (meth)acrylate, ethyl (meth)acrylate, n-propyl (meth)acrylate, i-propyl (meth)acrylate, n-butyl (meth) acrylate, i-butyl (meth)acrylate, n-amyl (meth)acrylate, i-amyl (meth)acrylate, hexyl (meth)acrylate, cyclohexyl (meth)acrylate, 2-ethylhexyl (meth)acrylate, n-octyl (meth) acrylate, nonyl (meth)acrylate, decyl (meth)acrylate, hydroxymethyl (meth)acrylate, hydroxyethyl (meth)acrylate, ethylene glycol (meth)acrylate, ethylene glycol di(meth)acrylate, propylene glycol di(meth)acrylate, trimethylolpropane tri(meth)acrylate, pentaerythritol tetra(meth) acrylate, dipentaerythritol hexa(meth)acrylate, allyl (meth) acrylate, ethylene di(meth)acrylate, and the like. The (meth) acrylate compound may be one or more compounds selected from these compounds. It is preferable to use one or more (meth)acrylate compounds selected from methyl (meth) acrylate, ethyl (meth)acrylate, and 2-ethylhexyl (meth)acrylate. It is particularly preferable to use methyl (meth)acrylate.

The polymer (A) preferably includes the repeating unit (c) derived from a (meth)acrylate compound in an amount of 5 to 40 parts by mass, and more preferably 10 to 30 parts by mass, based on 100 parts by mass of the total repeating units. The polymer (A) that includes the repeating unit (c) in an amount within the above range has moderate affinity to an electrolyte. This makes it possible to suppress an increase in internal resistance that may occur when the binder serves as an electrical resistance component in the battery. It is also possible to prevent a decrease in adhesion due to excessive absorption of the electrolyte.

1.1.2.4. Repeating Unit (d) Derived from Unsaturated Carboxylic Acid

When the polymer (A) includes the repeating unit (d) derived from an unsaturated carboxylic acid, it is possible to improve the stability of an electrode slurry that is prepared using the electrode binder composition according to one embodiment of the invention.

Specific examples of the unsaturated carboxylic acid include mono- or dicarboxylic acids (anhydrides) such as acrylic acid, methacrylic acid, crotonic acid, maleic acid, fumaric acid, and itaconic acid. The unsaturated carboxylic acid may be one or more compounds selected from these compounds. It is preferable to use one or more unsaturated carboxylic acids selected from acrylic acid, methacrylic acid, and itaconic acid.

The polymer (A) preferably includes the repeating unit (d) derived from an unsaturated carboxylic acid in an amount of 15 parts by mass or less, and more preferably 0.3 to 10 parts by mass, based on 100 parts by mass of the total repeating units. If the polymer (A) includes the repeating unit (d) in an amount within the above range, the polymer particles exhibit excellent dispersion stability (i.e., aggregates are hardly formed) when preparing an electrode slurry. It is also possible to suppress an increase in viscosity of the slurry over time.

1.1.2.5. Additional Repeating Unit

The polymer (A) may include an additional repeating unit other than the above repeating units. Examples of the additional repeating unit include a repeating unit derived from an alpha,beta-unsaturated nitrile compound.

When the polymer (A) includes a repeating unit derived from an alpha,beta-unsaturated nitrile compound, it is possible to further improve the swellability of the polymer (A) in an electrolyte. More specifically, a solvent easily enters the network structure formed of the polymer chains due to the presence of the nitrile group, and the internetwork space increases. Therefore, a solvated lithium ion easily passes through the network structure. It is considered the diffusivity of lithium ions is thus improved, and the electrode resistance decreases, so that excellent charge-discharge characteristics are achieved.

Specific examples of the alpha,beta-unsaturated nitrile compound include acrylonitrile, methacrylonitrile, alpha-chloroacrylonitrile, alpha-ethylacrylonitrile, vinylidene cyanide, and the like. The alpha,beta-unsaturated nitrile compound may be one or more compounds selected from these compounds. It is preferable to use one or more compounds selected from acrylonitrile and methacrylonitrile. It is more preferable to use acrylonitrile.

The polymer (A) preferably includes the repeating unit derived from an alpha,beta-unsaturated nitrile compound in an amount of 35 parts by mass or less, and more preferably 10 to 25 parts by mass, based on 100 parts by mass of the total repeating units. The polymer (A) that includes the repeating unit derived from an alpha,beta-unsaturated nitrile compound in an amount within the above range exhibits excellent affinity to an electrolyte, and has a moderate swelling rate. This contributes to an improvement in battery characteristics.

The polymer (A) may further include repeating units derived from fluorine-containing compounds that include an ethylenically unsaturated bond, such as vinylidene fluoride, tetrafluoroethylene, and hexafluoropropylene; alkylamides of an ethylenically unsaturated carboxylic acid, such as (meth)acrylamide and N-methylolacrylamide; vinyl carboxylates such as vinyl acetate and vinyl propionate; ethylenically unsaturated dicarboxylic anhydrides; monoalkyl esters; monoamides; aminoalkylamides of an ethylenically unsaturated carboxylic acid, such as aminoethylacrylamide, dimethylaminomethylmethacrylamide, and methylaminopropylmethacrylamide; and the like.

1.1.2.6. Production of Diene Polymer Particles

The diene polymer particles may be synthesized by an arbitrary method. The diene polymer particles may be easily synthesized by the following two-stage emulsion polymerization method, for example.

1.1.2.6.1. First-Stage Polymerization Step

A monomer component (I) that is used for the first-stage emulsion polymerization step includes a non-carboxylic acid monomer (e.g., alpha,beta-unsaturated nitrile compound, conjugated diene compound, aromatic vinyl compound, (meth)acrylate compound, and another copolymerizable monomer), and a carboxylic acid monomer (e.g., unsaturated carboxylic acid), for example. The monomer component (I) preferably includes the non-carboxylic acid monomer in an amount of 80 to 92 parts by mass, and more preferably 82 to 92 parts by mass, based on 100 parts by mass of the non-carboxylic acid monomer and the carboxylic acid monomer. If the monomer component (I) includes the non-carboxylic acid monomer in an amount within the above range, the polymer particles exhibit excellent dispersion stability (i.e., aggregates are hardly formed) when preparing an electrode slurry. It is also possible to suppress an increase in viscosity of the slurry over time.

The content of the (meth)acrylate compound in the non-carboxylic acid monomer included in the monomer component (I) is preferably 14 to 30 mass %. If the content of the (meth)acrylate compound is within the above range, the polymer particles exhibit excellent dispersion stability (i.e., aggregates are hardly formed) when preparing an electrode slurry. Moreover, since the resulting polymer particles exhibit moderate affinity to an electrolyte, it is possible to prevent a decrease in adhesion due to excessive absorption of an electrolyte.

The content of the conjugated diene compound in the non-carboxylic acid monomer included in the monomer component (I) is preferably 10 to 60 mass %. The content of the aromatic vinyl compound in the non-carboxylic acid monomer is preferably 20 to 50 mass %. The content of itaconic acid in the carboxylic acid monomer is preferably 50 to 85 mass %.

1.1.2.6.2. Second-Stage Polymerization Step

A monomer component (II) that is used for the second-stage emulsion polymerization step includes a non-carboxylic acid monomer (e.g., alpha,beta-unsaturated nitrile compound, conjugated diene compound, aromatic vinyl compound, (meth)acrylate compound, and another copolymerizable monomer), and a carboxylic acid monomer (e.g., unsaturated carboxylic acid), for example. The content of the non-carboxylic acid monomer in the monomer component (II) is preferably 94 to 99 mass %, and more preferably 96 to 98 mass %, based on the total amount (=100 mass %) of the non-carboxylic acid monomer and the carboxylic acid monomer. If the content of the non-carboxylic acid monomer is within the above range, the polymer particles exhibit excellent dispersion stability (i.e., aggregates are hardly formed) when preparing an electrode slurry. It is also possible to suppress an increase in viscosity of the slurry over time.

The content of the (meth)acrylate compound in the non-carboxylic acid monomer included in the monomer component (II) is preferably 11.5 mass % or less. If the content of the (meth)acrylate compound is within the above range, the resulting polymer particles exhibit moderate affinity to an electrolyte, so that it is possible to prevent a decrease in adhesion due to excessive absorption of an electrolyte.

The mass ratio "(I)/(II)" of the monomer component (I) to the monomer component (II) is preferably 0.05 to 0.5, and more preferably 0.1 to 0.4. If the mass ratio "(I)/(II)" is within the above range, the polymer particles exhibit excellent dispersion stability (i.e., aggregates are hardly formed) when preparing an electrode slurry. It is also possible to suppress an increase in viscosity of the slurry over time.

1.1.2.6.3. Emulsion Polymerization

The monomer component is subjected to emulsion polymerization in an aqueous medium in the presence of an emulsifier, an initiator, and a molecular weight modifier. Each material used for emulsion polymerization is described below.

Specific examples of the emulsifier include anionic surfactants such as higher alcohol sulfate salts, alkylbenzenesulfonates, alkyl diphenyl ether disulfonates, aliphatic sulfonates, aliphatic carboxylates, dehydroabietates, a naphthalenesulfonic acid-formalin condensate, and sulfate salts of a nonionic surfactant; nonionic surfactants such as polyethylene glycol alkyl esters, polyethylene glycol alkyl phenyl ethers, and polyethylene glycol alkyl ethers; fluorine-containing surfactants such as perfluorobutylsulfonates, perfluoroalkyl group-containing phosphates, perfluoroalkyl group-containing carboxylates, and perfluoroalkyl ethylene oxide adducts; and the like. The emulsifier may be one or more compounds selected from these compounds.

Specific examples of the initiator include water-soluble initiators such as lithium persulfate, potassium persulfate, sodium persulfate, and ammonium persulfate; oil-soluble initiators such as cumene hydroperoxide, benzoyl peroxide, t-butyl hydroperoxide, acetyl peroxide, diisopropylbenzene hydroperoxide, 1,1,3,3-tetramethylbutyl hydroperoxide, azobisisobutyronitrile, and 1,1'-azobis(cyclohexanecarbonitrile); and the like. These compounds may be appropriately used as the initiator. It is particularly preferable to use potassium persulfate, sodium persulfate, cumene hydroperoxide, or t-butyl hydroperoxide. The initiator is used in an appropriate amount taking account of the monomer composition, the pH of the polymerization system, the type of additional additive, and the like.

Specific examples of the molecular weight modifier include alkylmercaptans such as n-hexylmercaptan, n-octylmercaptan, t-octylmercaptan, n-dodecylmercaptan, t-dodecylmercaptan, and n-stearylmercaptan; xanthogen compounds such as dimethylxanthogen disulfide and diisopropylxanthogen disulfide; thiuram compounds such as terpinolene, tetramethylthiuram disulfide, tetraethylthiuram disulfide, and tetramethylthiuram monosulfide; phenol compounds such as 2,6-di-t-butyl-4-methylphenol and styrenated phenol; allyl compounds such as allyl alcohols; halogenated hydrocarbon compounds such as dichloromethane, dibromomethane, and carbon tetrabromide; vinyl ether compounds such as alpha-benzyloxystyrene, alpha-benzyloxyacrylonitrile, and alpha-benzyloxyacrylamide; triphenylethane; pentaphenylethane; acrolein; methacrolein; thioglycolic acid; thiomalic acid; 2-ethylhexyl thioglycolate; alpha-methylstyrene dimers; and the like. The molecular weight modifier may be one or more compounds selected from these compounds.

1.1.2.6.4. Emulsion Polymerization Conditions

The first-stage emulsion polymerization step is preferably performed at 40 to 80° C. for 2 to 4 hours. The polymerization conversion rate in the first-stage emulsion polymerization step is preferably 50% or more, and more preferably 60% or more. The second-stage emulsion polymerization step is preferably performed at 40 to 80° C. for 2 to 6 hours.

After completion of emulsion polymerization, the resulting dispersion is preferably neutralized by adding a neutralizer so as to adjust the pH of the dispersion to about 5 to about 10. The neutralizer is not particularly limited. Examples of the neutralizer include metal hydroxides (e.g., sodium hydroxide and potassium hydroxide), and ammonia. The dispersion exhibits excellent mixing stability as a result of adjusting the pH of the dispersion to 5 to 10. The pH of the dispersion is preferably adjusted to 6 to 9, and more preferably 7 to 8.5. Emulsion polymerization proceeds with excellent dispersion stability when the total solid content in the reaction mixture is adjusted to 50 mass % or less. The total solid content is preferably adjusted to 45 mass % or less, and more preferably 40 mass % or less. The neutralized dispersion may be concentrated so as to increase the solid content in the dispersion and further improve the stability of the particles.

1.1.3. Properties of Polymer (A)

1.1.3.1. Tetrahydrofuran (THF) Insoluble Content

The THF insoluble content in the polymer (A) is preferably 80% or more, and more preferably 90% or more. It is considered that the THF insoluble content in the polymer (A) is almost proportional to the content of components that are insoluble in an electrolyte used for an electrical storage device. If the THF insoluble content in the polymer (A) is within the above range, it is considered that elution of the polymer (A) into an electrolyte can be suppressed even when an electrical storage device that is produced using the polymer (A) is subjected to repeated charge-discharge cycles for a long term.

1.1.3.2. Transition Temperature

The polymer (A) preferably has only one endothermic peak within a temperature range of −50 to +250° C. when subjected to differential scanning calorimetry (DSC) in accordance with JIS K 7121. The polymer (A) more preferably has the only one endothermic peak within a temperature range of −30 to +30° C., and more preferably −25 to +5° C. If the polymer (A) has the only one endothermic peak within a temperature range of −30 to +30° C., the polymer (A) can provide more excellent flexibility and tackiness to an electrode active material layer (i.e., the adhesion of the electrode active material layer can be further improved).

1.1.3.3. Number Average Particle Size

When the electrode binder composition is a latex in which the polymer particles (A) are dispersed in the liquid medium (C), the polymer particles (A) preferably have a number average particle size of 50 to 400 nm, and more preferably 100 to 250 nm.

If the polymer particles (A) have a number average particle size within the above range, the polymer particles (A) are sufficiently adsorbed on the surface of an electrode active material, and move along with the movement of the electrode active material. This makes it possible to suppress migration of the polymer particles (A) or the electrode active material particles. Thus, a deterioration in electrical characteristics can be suppressed.

Note that the number average particle size of the polymer particles (A) refers to a particle size (D50) at 50% in a cumulative particle size distribution measured by a light scattering particle size analyzer. Examples of the light scattering particle size analyzer include Coulter LS230, Coulter LS100, Coulter LS13 320 (all manufactured by Beckman Coulter, Inc.), FPAR-1000 (Otsuka Electronics Co., Ltd.), and the like. These light scattering particle size analyzers can measure the particle size distribution of not only the primary particles of the polymer particles, but also the secondary particles that are formed due to aggregation of the primary particles. Therefore, the particle size distribution measured by the light scattering particle size analyzer can be used as an index of the dispersion state of the polymer particles included in an electrode slurry. The number average particle size of the polymer particles (A) may also be measured by centrifuging an electrode slurry that includes the electrode binder composition and an electrode active material to allow the electrode active material to precipitate, and analyzing the supernatant liquid by the light scattering particle size analyzer.

1.2. Carboxylic Acid or Salt Thereof (B)

The electrode binder composition according to one embodiment of the invention includes the carboxylic acid or a salt thereof (B) (hereinafter may be referred to as "component (B)"). The electrode binder composition preferably has a concentration of the component (B) of 20 to 1000 ppm, preferably 50 to 900 ppm, and more preferably 100 to 800 ppm. If the electrode binder composition has a concentration of the component (B) within the above range, the storage stability of the electrode binder composition is improved. Moreover, when an electrode slurry prepared using the electrode binder composition is applied to a collector, the interfacial resistance between the electrode active material layer and the collector is reduced, resulting in an improvement in charge-discharge characteristics.

The mechanism of the effect of the component (B) has not been made clear. It can be conjectured that the component (B) included in the electrode binder composition removes a metal oxide layer that is formed on the surface of the collector and has a relatively high resistance, so that the electrical characteristics are improved. For example, a passive-state aluminum oxide film is formed on the surface of a collector that is made of aluminum foil. The aluminum oxide film has insulating properties, and tends to increase the internal resistance when producing an electrode. It is considered that the electrode binder composition according to one embodiment of the invention removes such an insulating aluminum oxide film, so that the charge-discharge characteristics can be improved. The component (B) included in the electrode binder composition according to one embodiment of the invention need not have a molecular weight-increasing effect through a reaction between the components (B) or a reaction between the component (B) and another component, and need not function as a surfactant, so long as the component (B) contributes to modifying the surface of a collector.

If the electrode binder composition has a concentration of the component (B) of less than 20 ppm, the component (B) may not sufficiently contribute to modifying the surface of a collector, so that an electrical storage device that exhibits good charge-discharge characteristics may not be produced. If the electrode binder composition has a concentration of the component (B) of more than 1000 ppm, the component (B) may corrode the surface of a collector. A carboxylic acid is easily decarboxylated when heated, and decomposed into a low-molecular-weight component. Therefore, it is considered that the component (B) that remains in the electrode active material layer is gradually decomposed or volatilized when drying (heating) the electrode slurry that has been applied to the surface of a collector, and removed from the electrode active material layer to a certain extent. If the electrode binder composition has a concentration of the component (B) of more than 1000 ppm, a large amount of the component (B) may remain in the electrode active material layer even after drying the electrode slurry that has been applied to the surface of a collector, and may corrode the surface of the collector over time, and the resulting electrical storage device may not exhibit stable charge-discharge characteristics.

When using only an inorganic acid other than a carboxylic acid, the inorganic acid may significantly corrode the surface of a collector. Moreover, the inorganic acid may remain in the electrode active material layer even after drying the electrode slurry that has been applied on the surface of a collector, and may corrode the surface of a collector over time, and the resulting electrical storage device may not exhibit stable charge-discharge characteristics.

The component (B) included in the electrode binder composition according to one embodiment of the invention preferably has an acid dissociation constant (pKa) at 25° C. of 5.0 or more in at least one dissociation stage. Note that the acid dissociation constant (pKa) used herein refers to the acid dissociation constant (pKa) of a second carboxyl group when an organic acid includes two carboxyl groups, and refers to the acid dissociation constant (pKa) of a third carboxyl group when an organic acid includes three or more carboxyl groups. If the component (B) has an acid dissociation constant (pKa) of 5.0 or more, it is possible to remove the metal oxide layer by adding the component (B) at a concentration of 20 to 1000 ppm. It is also possible to decrease the amount of the component (B) that remains in the electrode active material layer.

The acid dissociation constant (pKa) may be measured by (a) the method described in The Journal of Physical Chemistry, vol. 68, No. 6, p. 1560 (1964), or (b) a method using a potential difference automatic titration apparatus (e.g., COM-980 Win) manufactured by Hiranuma Sangyo Co., Ltd., for example. Alternatively, (c) the acid dissociation constant described in *Kagaku Binran* (edited by The Chemical Society of Japan) (3rd edition, Jun. 25, 1984, Maruzen Co., Ltd.), (d) a database such as pKaBASE of Compudrug, or the like may also be used.

Specific examples of the component (B) included in the electrode binder composition according to one embodiment of the invention include acrylic acid, methacrylic acid, crotonic acid, maleic acid, fumaric acid, itaconic acid, malonic acid, citric acid, acetic acid, salts thereof, and the like. The component (B) may be one or more compounds selected from these compounds. It is particularly preferable that the component (B) be one or more compounds selected from acrylic acid, methacrylic acid, itaconic acid, acetic acid, and salts thereof.

1.3. Liquid Medium (C)

The electrode binder composition according to one embodiment of the invention includes the liquid medium (C). The liquid medium (C) is preferably an aqueous medium that contains water. The aqueous medium may include a non-aqueous medium other than water. Examples of the non-aqueous medium include amide compounds, hydrocarbons, alcohols, ketones, esters, amine compounds, lactones, sulfoxides, sulfone compounds, and the like. The non-aqueous medium may be one or more compounds selected from these compounds. When the liquid medium (C) includes water and the non-aqueous medium other than water, the content of water in the liquid medium (C) is preferably 90 mass % or more, and more preferably 98 mass % or more, based on the total amount (100 mass %) of the liquid medium (C). When using the aqueous medium as the liquid medium (C), the electrode binder composition according to one embodiment of the invention has a low impact on the environment, and is highly safety for an operator.

The aqueous medium preferably includes the non-aqueous medium in an amount of 10 parts by mass or less, and more preferably 5 parts by mass or less based on 100 parts by mass of the aqueous medium. It is particularly preferable that the aqueous medium do not substantially contain the non-aqueous medium. The expression "do not substantially contain" used herein means that the non-aqueous medium is not intentionally added as the liquid medium. Therefore, the liquid medium (C) may include a non-aqueous medium that is inevitably mixed in the liquid medium (C) when preparing the electrode binder composition.

1.4. Additive

The electrode binder composition according to one embodiment of the invention may optionally include an additive in addition to the components (A), (B), and (C). Examples of the additive include a thickener. When the electrode binder composition according to one embodiment of the invention includes a thickener, it is possible to further improve the applicability of the electrode binder composition, the charge-discharge characteristics of the resulting electrical storage device, and the like.

Examples of the thickener include cellulose compounds such as carboxymethyl cellulose, methyl cellulose, and hydroxypropyl cellulose; ammonium salts or alkali metal salts of the cellulose compounds; polycarboxylic acids such as poly(meth)acrylic acid and a modified poly(meth)acrylic acid; alkali metal salts of the polycarboxylic acids; polyvinyl alcohol (co)polymers such as polyvinyl alcohol, a modified polyvinyl alcohol, and an ethylene/vinyl alcohol copolymer; water-soluble polymers such as a saponified product of a copolymer of a vinyl ester and an unsaturated carboxylic acid (e.g., (meth)acrylic acid, maleic acid, or fumaric acid); and the like. It is particularly preferable to use an alkali metal salt of carboxymethyl cellulose, an alkali metal salt of poly(meth)acrylic acid, or the like.

Examples of a commercially available alkali metal salt of carboxymethyl cellulose include CMC1120, CMC1150, CMC2200, CMC2280, CMC2450 (all manufactured by Daicel Chemical Industries), and the like.

When the electrode binder composition according to one embodiment of the invention includes the thickener, the content of the thickener in the electrode binder composition is preferably 5 mass % or less, and more preferably 0.1 to 3 mass %, based on the total solid content of the electrode binder composition.

2. ELECTRICAL STORAGE DEVICE ELECTRODE SLURRY

An electrical storage device electrode slurry (hereinafter may be referred to as "electrode slurry") according to one embodiment of the invention may be produced using the electrode binder composition according to one embodiment of the invention. The term "electrode slurry" used herein refers to a dispersion that is applied to the surface of a collector, and dried to form an electrode active material layer on the surface of the collector. The electrode slurry according to one embodiment of the invention includes the electrode binder composition, an electrode active material, and water. Each component of the electrode slurry according to one embodiment of the invention is described in detail below. Note that the components included in the electrode binder composition are the same as described above.

2.1. Electrode Active Material

A material for forming the electrode active material included in the electrode slurry is not particularly limited. An arbitrary material may be appropriately selected depending on the type of the target electrical storage device.

For example, when producing a positive electrode of a lithium-ion secondary battery, it is preferable to use a lithium atom-containing oxide, and it is more preferable to use a lithium atom-containing oxide having an olivine structure. The lithium atom-containing oxide having an olivine structure has an olivine crystal structure, and is shown by the following general formula (1).

$$Li_{1-x}M_x(XO_4) \quad (1)$$

wherein M represents an ion of at least one metal selected from the group consisting of Mg, Ti, V, Nb, Ta, Cr, Mn, Fe, Co, Ni, Cu, Zn, Al, Ga, Ge, and Sn, X represents at least one atom selected from the group consisting of Si, S, P, and V, x is a number that is selected depending on the valences of M and (XO$_4$) so that the total valence of the general formula (1) is 0, and satisfies the relationship "0<x<1".

The electrode potential of the lithium atom-containing oxide having an olivine structure differs depending on the metal element M. Therefore, the battery voltage can be arbitrarily set by selecting the metal element M. Examples of the lithium atom-containing oxide having an olivine structure include LiFePO$_4$, LiCoPO$_4$, , and the like. Among these, LiFePO$_4$ is preferable since an iron compound used as the raw material is easily available and inexpensive. A compound in which the Fe ion of the above compounds is substituted with a Co ion, an Ni ion, or an Mn ion has the same crystal structure as the above compounds, and similarly functions as the electrode active material.

When producing a negative electrode of a lithium-ion secondary battery, carbon may be used as the active material (negative electrode active material), for example. Specific examples of carbon include a carbon material that is obtained by firing an organic polymer compound (e.g., phenol resin, polyacrylonitrile, or cellulose); a carbon material that is obtained by firing coke or pitch; artificial graphite; natural graphite; and the like.

When producing an electrical double-layer capacitor electrode, activated carbon, activated carbon fibers, silica, alumina, or the like may be used as the active material, for example. When producing a lithium-ion capacitor electrode, a carbon material (e.g., graphite, non-graphitizable carbon, hard carbon, or coke), a polyacenic organic semiconductor (PAS), or the like may be used as the active material, for example.

The electrode active material used for a positive electrode preferably has a number average particle size (Db) of 0.4 to 10 micrometers, and more preferably 0.5 to 7 micrometers. The electrode active material used for a negative electrode preferably has a number average particle size (Db) of 3 to 30 micrometers, and more preferably 5 to 25 micrometers. If the electrode active material has a number average particle size within the above range, the diffusion length of lithium ions in the electrode active material decreases. This makes it possible to reduce resistance that occurs due to insertion and extraction of lithium ions when charging/discharging the battery, so that the charge-discharge characteristics are further improved. When the electrode slurry includes a conductivity-imparting agent (described below), and the electrode active material has a number average particle size within the above range, the contact area between the electrode active material and the conductivity-imparting agent becomes sufficient, so that the electron conductivity of the electrode is improved, and the electrode resistance is further reduced.

Note that the number average particle size (Db) of the electrode active material refers to a particle size (D50) at 50% in a cumulative particle size distribution measured by a laser diffraction particle size analyzer. Examples of the laser diffraction particle size analyzer include HORIBA LA-300 series, HORIBA LA-920 series (all manufactured by Horiba, Ltd.), and the like. The laser diffraction particle size analyzer can measure the particle size distribution of not only the primary particles of the electrode active material, but also the secondary particles that are formed due to aggregation of the primary particles. Therefore, the number average particle size (Db) measured by the laser diffraction particle size analyzer can be used as an index of the dispersion state of the electrode active material in the electrode slurry. The number average particle size (Db) of the electrode active material may also be measured by centrifuging the electrode slurry to allow the electrode active material to precipitate, and analyzing the supernatant liquid by the laser diffraction particle size analyzer.

2.2. Optional Component

The electrode slurry may include an optional component other than the above components. Example of the optional component include a conductivity-imparting agent, a non-aqueous medium, a thickener, and the like.

2.2.1. Conductivity-Imparting Agent

A lithium-ion secondary battery may include carbon or the like as the conductivity-imparting agent. A nickel-hydrogen secondary battery may include cobalt oxide as the conductivity-imparting agent included in the positive electrode, and may include nickel powder, cobalt oxide, titanium oxide, carbon, or the like as the conductivity-imparting agent included in the negative electrode. Examples of carbon include graphite, activated carbon, acetylene black, furnace black, graphite, carbon fibers, fullerenes, and the like. Among these, acetylene black or furnace black is preferable. The conductivity-imparting agent is preferably used in an amount of 20 parts by mass or less, more preferably 1 to 15 parts by mass, and particularly preferably 2 to 10 parts by mass, based on 100 parts by mass of the electrode active material.

2.2.2. Non-Aqueous Medium

The electrode slurry may include a non-aqueous medium that has a normal boiling point of 80 to 350° C. from the viewpoint of improving the applicability of the electrode slurry. Specific examples of the non-aqueous medium include amide compounds such as N-methylpyrrolidone, dimethylformamide, and N,N-dimethylacetamide; hydrocarbons such as toluene, xylene, n-dodecane, and tetralin; alcohols such as 2-ethyl-1-hexanol, 1-nonanol, and lauryl alcohol; ketones such as methyl ethyl ketone, cyclohexanone, phorone, acetophenone, and isophorone; esters such as benzyl acetate, isopentyl butyrate, methyl lactate, ethyl lactate, and butyl lactate; amine compounds such as o-toluidine, m-toluidine, and p-toluidine; lactones such as gamma-butyrolactone and delta-butyrolactone; sulfoxide/sulfone compounds such as dimethyl sulfoxide and sulfolane; and the like. The non-aqueous medium may be one or more compounds selected from these compounds. It is preferable to use N-methylpyrrolidone as the non-aqueous medium in terms of the stability of the polymer particles, and workability when applying the electrode slurry.

2.2.3. Thickener

The electrode slurry may include the thickener in order to improve the applicability of the electrode slurry. Specific examples of the thickener include the compounds mentioned above in the section "1.4. Additive".

The content of the thickener in the electrode slurry is preferably 20 mass % or less, more preferably 0.1 to 15 mass %, and particularly preferably 0.5 to 10 mass %, based on the total solid content of the electrode slurry.

2.3. Method of Preparing Electrode Slurry

The electrode slurry according to one embodiment of the invention may be prepared by mixing the electrode binder composition according to one embodiment of the invention, the electrode active material, water, and an optional additive. The components may be mixed with stirring using a known technique (e.g., technique using a stirrer, a deaerator, a bead mill, a high-pressure homogenizer, or the like).

It is preferable that at least part of the electrode slurry preparation process (i.e., the component mixing operation) be performed under reduced pressure. This makes it possible to prevent formation of bubbles in the resulting electrode layer. It is preferable to mix the components under a reduced pressure (absolute pressure) of about $5.0 \times 10^3$ to about $5.0 \times 10^4$ Pa.

When mixing (stirring) the components to prepare the electrode slurry, it is necessary to select a mixer that can stir the components so that aggregates of the electrode active material do not remain in the resulting slurry, and select necessary and sufficient dispersion conditions. The degree of dispersion may be measured using a grind gage. It is preferable that the components be mixed and dispersed so that the resulting slurry does not include aggregates having a size of 100 micrometers or more. Examples of the mixer that satisfies the above conditions include a ball mill, a sand mill, a pigment disperser, a grinder, an ultrasonic disperser, a homogenizer, a planetary mixer, a Hobart mixer, and the like.

2.4. Properties of Electrode Slurry

When the polymer (A) included in the electrode binder composition is polymer particles, the ratio "Da/Db" of the number average particle size (Da) of the polymer particles to the number average particle size (Db) of the electrode active material is preferably 0.01 to 1.0, and more preferably 0.05 to 0.5 when producing a positive electrode. The ratio "Da/Db" is preferably 0.002 to 0.13, and more preferably 0.003 to 0.1 when producing a negative electrode. The technical meaning of the above range is described as follows.

It was confirmed that at least one of the polymer particles and the electrode active material migrates when drying a film formed by applying the electrode slurry to the surface of a collector. Specifically, the particles move along the thickness direction of the film due to surface tension. More specifically, at least one of the polymer particles and the electrode active material moves toward the side of the film that does not come in contact with the collector (i.e., a gas-solid interface at which water evaporates). When migration has occurred, the distribution of the polymer particles and the electrode active material becomes non-uniform in the thickness direction of the film, so that a deterioration in electrode characteristics, a decrease in adhesion, and the like may occur. For example, when the polymer particles that function as a binder have bled (moved) toward the gas-solid interface of the electrode active material layer, and the amount of the polymer particles at the interface between the collector and the electrode active material layer has relatively decreased, penetration of an electrolyte into the electrode active material layer is hindered, so that sufficient electrical characteristics may not be achieved. Moreover, adhesion between the collector and the electrode active material layer may decrease, so that the electrode active material layer may be removed from the collector. When the polymer particles have bled, the smoothness of the electrode active material layer surface may deteriorate.

If the ratio "Da/Db" is within the above range, it is possible to prevent the above problems, and easily produce an electrode that exhibits excellent electrical characteristics and excellent adhesion. If the ratio "Da/Db" is less than the above range, the difference in average particle size between the polymer particles and the electrode active material may become small. This may decrease the contact area between the polymer particles and the electrode active material, so that powder fall resistance may become insufficient. If the ratio "Da/Db" exceeds the above range, the difference in average particle size between the polymer particles and the electrode active material may increase to a large extent. As a result, the adhesion of the polymer particles may become insufficient, so that the adhesion between the collector and the electrode active material layer may become insufficient.

The solid content (i.e., the ratio of the total mass of the components other than a solvent with respect to the total mass of the slurry) of the electrode slurry according to one embodiment of the invention is preferably 20 to 80 mass %, and more preferably 30 to 75 mass %.

The electrode slurry according to one embodiment of the invention preferably has a spinnability of 30 to 80%, more preferably 33 to 79%, and still more preferably 35 to 78%. If the spinnability is less than 30%, the leveling properties of the electrode slurry may be insufficient when applying the electrode slurry to the collector, so that it may be difficult to produce an electrode having a uniform thickness. If an electrode having a non-uniform thickness is used to produce a battery, an in-plane distribution of the charge-discharge reaction may occur, so that it may be difficult to achieve stable battery characteristics. If the spinnability exceeds 80%, dripping may easily occur when applying the electrode slurry to the collector, so that it may be difficult to obtain an electrode with a stable quality. If the spinnability is within the above range, it is possible to prevent such problems, and easily produce an electrode that exhibits excellent electrical characteristics and excellent adhesion.

The term "spinnability" used herein refers to a value measured as follows.

Specifically, a Zahn cup ("Zahn Viscosity Cup No. 5" manufactured by Taiyu Kizai Co., Ltd.) having an orifice (diameter: 5.2 mm) at the bottom thereof is provided. 40 g of the electrode slurry is poured into the Zahn cup in a state in which the orifice is closed. When the orifice is opened, the electrode slurry begins to flow out from the orifice. The spinnability is calculated by the following expression (2) when the time when the orifice is opened is referred to as $T_0$, the time when the electrode slurry no longer flows out from the orifice as if to form a thread is referred to as $T_A$, and the time when the electrode slurry no longer flows out from the orifice is referred to as $T_B$.

$$\text{Spinnability (\%)} = ((T_A - T_0)/(T_B - T_0)) \times 100 \quad (2)$$

3. ELECTRICAL STORAGE DEVICE ELECTRODE

An electrical storage device electrode (hereinafter may be referred to as "electrode") according to one embodiment of the invention includes a collector, and a layer that is formed by applying the electrode slurry according to one embodiment of the invention to the surface of the collector, and drying the slurry. The electrode may be produced by applying the electrode slurry to the surface of an arbitrary collector (e.g., metal foil) to form a film, and drying the film. The electrode thus produced has a structure in which an electrode active material layer that includes the polymer (A), the electrode active material, and an optional component is bonded to the collector. The electrode exhibits excellent adhesion between the collector and the electrode active material layer, and has excellent charge-discharge rate characteristics (i.e., electrical characteristics). Therefore, the electrode may be suitable as an electrode used for an electrical storage device.

The collector is not particularly limited so long as the collector is made of a conductive material. A collector made of a metal (e.g., iron, copper, aluminum, nickel, or stainless steel) may be used for a lithium-ion secondary battery. The effects of the electrode slurry that is prepared using the electrode binder composition are most effectively achieved when using an aluminum collector for the positive electrode, and using a copper collector for the negative electrode. A collector made of a perforated metal, an expanded metal, wire gauze, a foam metal, sintered metal fibers, a metal-plated resin sheet, or the like is used for a nickel-hydrogen secondary battery. The shape and the thickness of the collector are not particularly limited. It is preferable to use a sheet-like collector having a thickness of about 0.001 to about 0.5 mm.

The electrode slurry may be applied to the collector by an arbitrary application method. Examples of the application method include a doctor blade method, a dipping method, a reverse roll method, a direct roll method, a gravure method, an extrusion method, an immersion method, a brush coating method, and the like. The amount of the electrode slurry applied to the collector is not particularly limited. It is preferable that the electrode slurry be applied to the collector so that an electrode active material layer obtained by removing the liquid medium has a thickness of 0.005 to 5 mm, and more preferably 0.01 to 2 mm.

The film formed by applying the electrode slurry may be dried (i.e., water and an optional non-aqueous medium may be removed) by an arbitrary method. For example, the film may be dried using warm air, hot air, or low humid air, may be dried under vacuum, or may be dried by applying (far) infrared radiation, electron beams, or the like. The drying speed may be appropriately set so that the liquid medium can be removed as quickly as possible, cracks do not occur in the electrode active material layer due to stress concentration, and the electrode active material layer is not removed from the collector.

It is preferable to increase the density of the electrode active material layer by pressing the dried collector. The collector may be pressed using a die press, a roll press, or the like. The density of the electrode active material layer used for a positive electrode after pressing is preferably 1.6 to 2.4 g/cm$^3$, and more preferably 1.7 to 2.2 g/cm$^3$. The density of the electrode active material layer used for a negative electrode after pressing is preferably 1.2 to 1.9 g/cm$^3$, and more preferably 1.3 to 1.8 g/cm$^3$.

4. ELECTRICAL STORAGE DEVICE

An electrical storage device may be produced using the electrode according to one embodiment of the invention. The electrical storage device according to one embodiment of the invention includes the electrode and an electrolyte, and may be produced by a normal method using various parts (e.g., separator). Specifically, the electrical storage device may be produced by placing a negative electrode on a positive electrode via a separator to form a laminate, rolling or folding the laminate in the shape of a battery, placing the laminate in a battery casing, injecting an electrolyte into the battery casing, and sealing the battery casing, for example. The battery may have an arbitrary shape (e.g., coin, button, sheet, cylinder, square, or flat shape).

The electrolyte may be in the form of a liquid or gel. The electrolyte may be selected from known electrolytes used for an electrical storage device depending on the type of the electrode active material so that the function of the battery is effectively achieved. The electrolyte may be a solution prepared by dissolving an electrolyte in an appropriate solvent.

An arbitrary lithium salt may be used as the electrolyte used for a lithium-ion secondary battery. Specific examples of the lithium salt include $LiClO_4$, $LiBF_4$, $LiPF_6$, $LiCF_3CO_2$, $LiAsF_6$, $LiSbF_6$, $LiB_{10}Cl_{10}$, $LiAlCl_4$, $LiCl$, $LiBr$, $LiB(C_2H_5)_4$, $LiCF_3SO_3$, $LiCH_3SO_3$, $LiC_4F_9SO_3$, $Li(CF_3SO_2)_2N$, lithium carboxylate, and the like. When producing a nickel-hydrogen secondary battery, a potassium hydroxide aqueous solution (concentration: 5 mol/l or more) may be used as the electrolyte, for example.

The solvent used to dissolve the electrolyte is not particularly limited. Specific examples of the electrolyte include carbonate compounds such as propylene carbonate, ethylene carbonate, butylene carbonate, dimethyl carbonate, methylethyl carbonate, and diethyl carbonate; lactone compounds such as gamma-butyrolactone; ether compounds such as trimethoxymethane, 1,2-dimethoxyethane, diethyl ether, 2-ethoxyethane, tetrahydrofuran, and 2-methyltetrahydrofuran; sulfoxide compounds such as dimethyl sulfoxide; and the like. The electrolyte may be one or more compounds selected from these compounds. The concentration of the electrolyte is preferably 0.5 to 3.0 mol/l, and more preferably 0.7 to 2.0 mol/l.

5. EXAMPLES

The invention is described below in detail by way of examples. Note that the invention is not limited to the following examples. In the examples and comparative examples, the unit "parts" refers to "parts by mass", and the unit "%" refers to "mass %", unless otherwise specified.

5.1. Example 1

5.1.1. Production of Polymer (A)

An autoclave (internal volume: about 6 l) equipped with an electromagnetic stirrer, of which the internal atmosphere had been sufficiently replaced with nitrogen, was charged with 2.5 l of deoxidized purified water and 25 g of ammonium perfluorodecanoate (emulsifier). The mixture was heated to 60° C. with stirring at 350 rpm. The autoclave was then charged with a monomer gas mixture of vinylidene fluoride (VDF(R)) (70%) and hexafluoropropylene (HFP) (30%) until the internal pressure reached 20 kg/cm$^2$. 25 g of a CFC-113 solution containing 20% of diisopropyl peroxydicarbonate (initiator) was injected into the autoclave using nitrogen gas to initiate polymerization. The internal pressure was maintained at 20 kg/cm$^2$ during polymerization by successively injecting a gas mixture of VDF (60.2%) and HFP (39.8%). Since the polymerization rate decreases as polymerization proceeds, 25 g of a CFC-113 solution containing 20% of diisopropyl peroxydicarbonate was again injected using nitrogen gas when 3 hours had elapsed, and the monomers were polymerized for a further 3 hours. The reaction mixture was then cooled without stirring, and unreacted monomers were removed to obtain an aqueous dispersion containing fine particles of a polymer (Aa) (concentration: 40%). The mass ratio of VDF and HFP in the polymer (Aa) determined by $^{19}$F-NMR analysis was 21/4.

A 7 l separable flask, of which the internal atmosphere had been sufficiently replaced with nitrogen, was charged with 1600 g of the aqueous dispersion containing the fine particles of the polymer (Aa) (polymer (Aa): 25 parts by mass), 0.5 parts by mass of an emulsifier "Adeka Reasoap SR1025" (manufactured by Adeka Corporation), 30 parts by mass of methyl methacrylate (MMA), 40 parts by mass of 2-ethylhexyl acrylate (EHA), 5 parts by mass of methacrylic acid (MAA), and 130 parts by mass of water. The mixture was stirred at 70° C. for 3 hours, so that the monomers were absorbed in the polymer (Aa). After the addition of 20 ml of a tetrahydrofuran solution containing 0.5 parts by mass of azobisisobutyronitrile (oil-soluble initiator), the mixture was reacted at 75° C. for 3 hours, and then reacted at 85° C. for 2 hours. After cooling the mixture to terminate the reaction, the pH of the mixture was adjusted to 7 using a 2.5N sodium hydroxide aqueous solution to obtain an aqueous dispersion containing particles of a polymer (A) (concentration: 40%).

About 10 g of the resulting aqueous dispersion was weighed on a Teflon petri dish (diameter: 8 cm), and dried at 120° C. for 1 hour to form a film. 1 g of the resulting film (polymer) was immersed in 400 ml of tetrahydrofuran (THF), followed by shaking at 50° C. for 3 hours. After filtering the THF phase through a wire gauze (300 mesh) to separate THF insoluble components, THF contained in the filtrate was evaporated off, and the weight (Y (g)) of the residue was measured. The THF insoluble content in the polymer particles calculated by the following expression (3) was 85%.

$$\text{THF insoluble content (\%)} = ((1-Y)/1) \times 100 \qquad (3)$$

The resulting fine particles were subjected to differential scanning calorimetry using a differential scanning calorimeter (DSC). It was confirmed that the fine particles had only one glass transition temperature (Tg) at −5° C. Since the particles of the polymer (A) had only one Tg in spite of using two kinds of polymer, it is considered that the particles of the polymer (A) were polymer alloy particles.

5.1.2. Preparation of Electrode Binder Composition 31 g of an acetic acid (1%) aqueous solution was added to 1000 g of the aqueous dispersion containing the particles of the polymer (A) obtained in the section "5.1.1. Production of polymer (A)". The mixture was stirred at 150 rpm to prepare an electrode binder composition.

The particle size distribution of the electrode binder composition was measured using a dynamic light scattering particle size analyzer ("FPAR-1000" manufactured by Otsuka Electronics Co., Ltd.), and the modal particle size was determined from the particle size distribution. The number average particle size was calculated to be 330 nm.

The content of the component (B) in the electrode binder composition may be determined by analyzing the electrode binder composition by the following method. 0.2 g of the electrode binder composition was weighed, and diluted 50 times using a maleic acid aqueous solution (200 ppm) (internal standard solution) to prepare a measurement sample. The measurement sample was quantitatively determined using a liquid chromatography system ("UV8020" manufactured by Tosoh Corp., column: "TSKgelSCX (H+)" manufactured by Tosoh Corp.). It was confirmed that the content of acetic acid was 300 ppm.

5.1.3. Evaluation of Storage Stability of Electrode Binder Composition

A large amount of electrode binder composition is normally stored for use in an electrical storage device factory. The stored electrode binder composition is used portion by portion as necessary. Therefore, the properties of the electrode binder composition should not change during long-term storage due to precipitation of the polymer or the like.

The electrode binder composition may be subjected to a low-temperature environment (about 0° C.) due to a change in ambient temperature during storage since it is difficult to precisely control the storage temperature in terms of cost. Therefore, an electrode binder composition that freezes at 0° C. when evaluating the freezing temperature is not acceptable. The electrode binder composition is required to have a freezing temperature of −0.5° C. or less. When the electrode binder composition has a freezing temperature of −0.5° C. or less, it is determined that the electrode binder composition exhibits excellent stability.

<Evaluation of Precipitation>

100 g of the electrode binder composition prepared in the section "5.1.2. Preparation of electrode binder composition" was put in a polyethylene bottle, and stored at 2° C. for 1 month in a refrigerator. When 1 month had elapsed, the electrode binder composition was observed with the naked eye. A case where precipitation was not observed was evaluated as "Acceptable", and a case where precipitation was observed was evaluated as "Unacceptable". The precipitation evaluation results are shown in Table 1.

<Evaluation of Freezing Temperature>

1000 g of the electrode binder composition prepared in the section "5.1.2. Preparation of electrode binder composition" was put in a polyethylene bottle, and stored at −10° C. in a refrigerator. The temperature (freezing temperature) at which the electrode binder composition began to freeze was measured. It was found that the freezing temperature of the electrode binder composition was −0.7° C. The freezing temperature evaluation results are shown in Table 1.

5.1.4. Preparation and Evaluation of Electrode Slurry

A twin-screw planetary mixer ("TK HIVIS MIX 2P-03" manufactured by PRIMIX Corporation) was charged with 1 part by mass (solid content) of a thickener ("CMC1120" manufactured by Daicel Chemical Industries), 100 parts by mass of an electrode active material (particle size (D50): 0.5 micrometers) (the electrode active material was obtained by grinding commercially available lithium iron phosphate ($LiFePO_4$) using an agate mortar, and classifying the ground product using a sieve), 5 parts by mass of acetylene black, and 68 parts by mass of water. The mixture was stirred at 60 rpm for 1 hour. The electrode binder composition stored as described in the section "5.1.3. Evaluation of storage stability of electrode binder composition" was added to the mixture so that the amount of the polymer particles was 1 part by mass, and the mixture was stirred for 1 hour to obtain a paste. After the addition of water to the paste to adjust the solid content to 50%, the mixture was stirred at 200 rpm for 2 minutes, stirred at 1800 rpm for 5 minutes, and stirred at 1800 rpm for 1.5 minutes under vacuum (about $5.0 \times 10^3$ Pa) using a stirrer/deaerator ("THINKY Mixer (*Awatori Rentarou*)" manufactured by THINKY Corporation) to prepare an electrode slurry.

<Measurement of Spinnability>

The spinnability of the electrode slurry was evaluated as follows.

A Zahn cup ("Zahn Viscosity Cup No. 5" manufactured by Taiyu Kizai Co., Ltd.) having an orifice (diameter: 5.2 mm) at the bottom thereof was provided. 40 g of the electrode slurry was poured into the Zahn cup in a state in which the orifice was closed. When the orifice was opened, the electrode slurry began to flow out from the orifice. The time when the orifice was opened is referred to as $T_0$. The time ($T_A$) in which the electrode slurry continuously flowed out from the orifice in the shape of a thread was measured with the naked eye. The time ($T_B$) elapsed until the electrode slurry no longer flowed out from the orifice was also measured. The spinnability of the electrode slurry was calculated by substituting the values $T_0$, $T_A$, and $T_B$ into the following expression (2).

$$\text{Spinnability (\%)} = ((T_A - T_0)/(T_B - T_0)) \times 100 \qquad (2)$$

A case where the electrode slurry had a spinnability of 30 to 80% was evaluated as "Acceptable". The spinnability measurement results are shown in Table 1.

5.1.5. Production and Evaluation of Electrode

The electrode slurry prepared in the section "5.1.4. Preparation and evaluation of electrode slurry" was uniformly applied to the surface of an aluminum foil collector (thickness: 30 micrometers) by a doctor blade method so that the film had a thickness of 100 micrometers after drying. The film was then dried at 120° C. for 20 minutes. The film was then pressed using a roll press so that the resulting electrode active material layer had the density shown in Table 1 to obtain a an electrode (positive electrode).

<Measurement of Crack Rate>

The electrode was cut into an electrode plate (width: 2 cm, length: 10 cm), and the electrode plate was subjected to a folding test, in which the electrode plate was folded 100 times in the widthwise direction along a round bar (diameter: 2 mm). The size of a crack that occurred along the round bar was measured with the naked eye to calculate the crack rate. Note that the crack rate was calculated by the following expression (4).

$$\text{Crack rate (\%)} = (\text{length(mm) of crack}/\text{length(mm) of electrode plate}) \times 100 \quad (4)$$

An electrode plate that exhibits excellent flexibility and adhesion has a low crack rate. It is desirable that the electrode have a crack rate of 0%. However, the electrode may have a crack rate of up to 20% when winding the electrode plate together with a separator in a spiral shape. If the electrode has a crack rate of more than 20%, the electrode may easily break (i.e., the electrode plates cannot be produced), resulting in a decrease in productivity. Therefore, the threshold value of the crack rate is 20%. The crack rate measurement results are shown in Table 1.

5.1.6. Production and Evaluation of Electrical Storage Device

<Production of Counter Electrode (Negative Electrode)>

A twin-screw planetary mixer ("TK HIVIS MIX 2P-03" manufactured by PRIMIX Corporation) was charged with 4 parts by mass (solid content) of polyvinylidene fluoride (PVDF), 100 parts by mass of graphite (negative electrode active material), and 80 parts by mass of N-methylpyrrolidone (NMP). The mixture was stirred at 60 rpm for 1 hour. After the addition of 20 parts by mass of NMP, the mixture was stirred at 200 rpm for 2 minutes, stirred at 1800 rpm for 5 minutes, and stirred at 1800 rpm for 1.5 minutes under vacuum using a stirrer/deaerator ("THINKY Mixer (*Awatori Rentarou*)" manufactured by THINKY Corporation) to prepare a counter electrode (negative electrode) slurry.

The counter electrode (negative electrode) electrode slurry thus prepared was uniformly applied to the surface of a copper foil collector by a doctor blade method so that the film had a thickness of 150 micrometers after drying. The film was then dried at 120° C. for 20 minutes. The film was then pressed using a roll press so that the film had a density of 1.5 g/cm$^3$ to obtain a counter electrode (negative electrode).

<Assembly of Lithium-Ion Battery Cell>

In a gloved box of which the internal atmosphere was substituted with argon (Ar) so that the dew point was −80° C. or less, a negative electrode (diameter: 16.16 mm) prepared by punching the negative electrode produced in the section "Production of counter electrode (negative electrode)" was placed on a two-electrode coin cell ("HS Flat Cell" manufactured by Hohsen Corp.). A separator ("Celgard #2400" manufactured by Celgard, LLC.) (diameter: 24 mm) prepared by punching a polypropylene porous membrane was placed on the negative electrode, and 500 microliters of an electrolyte was injected into the two-electrode coin cell while avoiding entrance of air. A positive electrode (diameter: 15.95 mm) prepared by punching the positive electrode produced in the section "5.1.5. Production and evaluation of electrode" was placed on the separator, and the outer casing of the two-electrode coin cell was air-tightly secured using a screw to assemble a lithium-ion battery cell (electrical storage device). Note that the electrolyte was prepared by dissolving LiPF$_6$ in ethylene carbonate/ethylmethyl carbonate (mass ratio=1/1) at a concentration of 1 mol/l.

<Evaluation of Charge-Discharge Rate Characteristics>

The electrical storage device was charged at a constant current of 0.2 C until the voltage reached 4.2 V. The electrical storage device was continuously charged at a constant voltage of 4.2 V. The current was cut off (i.e., the electrical storage device was determined to be fully charged) when the current value reached 0.01 C, and the charge capacity at 0.2 C was measured. The electrical storage device was then discharged at a constant current of 0.2 C. The current was cut off (i.e., the electrical storage device was determined to be fully discharged) when the voltage reached 2.7 V, and the discharge capacity at 0.2 C was measured.

The electrical storage device was then charged at a constant current of 3 C. After the voltage reached 4.2 V, the electrical storage device was continuously charged at a voltage of 4.2 V. The current was cut off (i.e., the electrical storage device was determined to be fully charged) when the current value reached 0.01 C, and the charge capacity at 3 C was measured. The electrical storage device was then discharged at a constant current of 3 C. The current was cut off (i.e., the electrical storage device was determined to be fully discharged) when the voltage reached 2.7 V, and the discharge capacity at 3 C was measured.

The charge rate (%) of the electrical storage device was determined by calculating the rate (%) of the charge capacity at 3 C to the charge capacity at 0.2 C. The discharge rate (%) of the electrical storage device was determined by calculating the rate (%) of the discharge capacity at 3 C to the discharge capacity at 0.2 C. When the charge rate and the discharge rate are 80% or more, the charge-discharge rate characteristics were evaluated as "Acceptable". The charge rate and the discharge rate thus determined are shown in Table 1.

Note that "1 C" refers to a current value that requires 1 hour to fully discharge a cell having a constant electric capacitance. For example, "0.1 C" refers to a current value that requires 10 hours to fully discharge a cell, and "10 C" refers to a current value that requires 0.1 hours to fully discharge a cell.

5.2. Examples 2 to 4 and Comparative Examples 1 to 3

An aqueous dispersion containing particles of a polymer (A) having the composition shown in Table 1 was prepared in the same manner as in the section "5.1.1. Production of polymer (A)" in Example 1, except for changing the monomer composition and the amount of the emulsifier. Water was removed under reduced pressure or added depending on the solid content of the aqueous dispersion, to obtain an aqueous dispersion having a solid content of 40%. The fine particles obtained in Examples 2 to 4 and Comparative Examples 1 to 3 were subjected to differential scanning calorimetry using a differential scanning calorimeter (DSC). Only one glass transition temperature (Tg) was observed at the temperature shown in Table 1. Since the particles of the polymer (A) had only one Tg in spite of using two kinds of polymers, it is considered that the particles of the polymer (A) were polymer alloy particles.

An electrode binder composition was prepared in the same manner as in the section "5.1.2. Preparation of electrode binder composition" in Example 1, except for changing the type and the amount of the component (B) as shown in Table 1. The electrode binder composition was evaluated in the same manner as in the section "5.1.3. Evaluation of storage stability of electrode binder composition" in Example 1. The results are shown in Table 1.

An electrode slurry was prepared and evaluated in the same manner as in the section "5.1.4. Preparation and evaluation of electrode slurry" in Example 1, an electrode was produced and evaluated in the same manner as in the section "5.1.5. Production and evaluation of electrode" in Example 1, and an electrical storage device was produced and evaluated in the same manner as in the section "5.1.6. Production and evaluation of electrical storage device" in Example 1. The results are shown in Table 1.

5.3. Example 5

An aqueous dispersion containing particles of a polymer (A) having the composition shown in Table 1 was prepared in the same manner as in the section "5.1.1. Production of polymer (A)" in Example 1, except for changing the monomer composition and the amount of the emulsifier. Water was removed under reduced pressure or added depending on the solid content of the aqueous dispersion to obtain an aqueous dispersion having a solid content of 40%. The fine particles obtained in Example 5 were subjected to differential scanning calorimetry using a differential scanning calorimeter (DSC). Only one glass transition temperature (Tg) was observed at the temperature shown in Table 1. Since the particles of the polymer (A) had only one Tg in spite of using two kinds of polymers, it is considered that the particles of the polymer (A) were polymer alloy particles.

An electrode binder composition was prepared in the same manner as in the section "5.1.2. Preparation of electrode binder composition" in Example 1, except for changing the type and the amount of the component (B) as shown in Table 1. The electrode binder composition was evaluated in the same manner as in the section "5.1.3. Evaluation of storage stability of electrode binder composition" in Example 1. The results are shown in Table 1.

An electrode slurry was prepared in the same manner as in the section "5.1.4. Preparation and evaluation of electrode slurry" in Example 1, except for charging a twin-screw planetary mixer ("TK HIVIS MIX 2P-03" manufactured by PRIMIX Corporation) with 0.5 parts by mass (solid content) of a thickener ("CMC2200" manufactured by Daicel Chemical Industries), 100 parts by mass of an electrode active material (particle size (D50): 0.5 micrometers) (the electrode active material was obtained by grinding commercially available lithium iron phosphate (LiFePO$_4$) using an agate mortar, and classifying the ground product using a sieve), 5 parts by mass of acetylene black, and 68 parts by mass of water, stirring the mixture at 60 rpm for 1 hour, adding 0.5 parts by mass (solid content) of a thickener ("CMC2200" manufactured by Daicel Chemical Industries) to the mixture, and stirring the mixture at 60 rpm for 1 hour. The results are shown in Table 1.

An electrode was produced and evaluated in the same manner as in the section "5.1.5. Production and evaluation of electrode" in Example 1, and an electrical storage device was produced and evaluated in the same manner as in the section "5.1.6. Production and evaluation of electrical storage device" in Example 1. The results are shown in Table 1.

5.4. Example 6

5.4.1. Production of Polymer (A)

A temperature-adjustable autoclave equipped with a stirrer was charged with 200 parts by mass of water, 0.6 parts by mass of sodium dodecylbenzene sulfonate, 1.0 part by mass of potassium persulfate, 0.5 parts by mass of sodium hydrogen sulfite, 0.2 parts by mass of an alpha-methylstyrene dimer, 0.2 parts by mass of dodecylmercaptan, and the first-stage polymerization components shown in Table 2. The mixture was heated to 70° C., and polymerized for 2 hours. After confirming that the polymerization conversion rate was 80% or more, the second-stage polymerization components shown in Table 2 were added to the mixture over 6 hours while maintaining the reaction temperature at 70° C. When 3 hours had elapsed after the start of addition of the second-stage polymerization components, 1.0 part by mass of an alpha-methylstyrene dimer and 0.3 parts by mass of dodecylmercaptan were added to the mixture. After the addition of the second-stage polymerization components, the mixture was heated to 80° C., and reacted for 2 hours. After completion of polymerization, the pH of the resulting latex was adjusted to 7.5, followed by the addition of 5 parts by mass (solid content) of potassium tripolyphosphate. The residual monomers were removed by steam distillation, and the residue was concentrated under reduced pressure until the solid content reached 50% to obtain an aqueous dispersion containing particles of a polymer (A) (content: 50%).

5.4.2. Preparation of Electrode Binder Composition 26 g of an itaconic acid (2%) aqueous solution was added to 1000 g of the aqueous dispersion containing the particles of the polymer (A) obtained in the section "5.4.1. Production of polymer (A)". The mixture was stirred at 150 rpm to prepare an electrode binder composition.

The particle size distribution of the electrode binder composition was measured using a dynamic light scattering particle size analyzer ("FPAR-1000" manufactured by Otsuka Electronics Co., Ltd.), and the modal particle size was determined from the particle size distribution. The number average particle size was calculated to be 200 nm.

The content of the component (B) in the electrode binder composition may be determined by analyzing the binder composition by the following method. 0.2 g of the electrode binder composition was weighed, and diluted 50 times using a maleic acid aqueous solution (200 ppm) (internal standard solution) to obtain a measurement sample. The measurement sample was quantitatively determined using a liquid chromatography system ("UV8020" manufactured by Tosoh Corp., column: "TSKgelSCX(H+)" manufactured by Tosoh Corp.). It was confirmed that the content of itaconic acid was 500 ppm.

5.4.3. Evaluation of Storage Stability of Electrode Binder Composition

The storage stability of the electrode binder composition was evaluated in the same manner as in the section "5.1.3.

Evaluation of storage stability of electrode binder composition". The results are shown in Table 1.

5.4.4. Preparation and Evaluation of Electrode Slurry

A twin-screw planetary mixer ("TK HIVIS MIX 2P-03" manufactured by PRIMIX Corporation) was charged with 1 part by mass (solid content) of a thickener ("CMC1120" manufactured by Daicel Chemical Industries), 100 parts by mass (solid content) of graphite (negative electrode active material), and 68 parts by mass of water. The mixture was stirred at 60 rpm for 1 hour. After the addition of 2 parts by mass of the electrode binder composition stored as described in the section "5.4.3. Evaluation of storage stability of electrode binder composition", the mixture was stirred for 1 hour to obtain a paste. After the addition of water to the paste to adjust the solid content to 50%, the mixture was stirred at 200 rpm for 2 minutes, stirred at 1800 rpm for 5 minutes, and stirred at 1800 rpm for 1.5 minutes under vacuum, using a stirrer/deaerator ("THINKY Mixer (*Awatori Rentarou*)" manufactured by THINKY Corporation) to prepare an electrode slurry.

The spinnability of the electrode slurry was evaluated in the same manner as in the section "5.1.4. Preparation and evaluation of electrode slurry". The results are shown in Table 1.

5.4.5. Production and Evaluation of Electrode

The electrode slurry prepared in the section "5.4.4. Preparation and evaluation of electrode slurry" was uniformly applied to the surface of a copper foil collector (thickness: 20 micrometers) by a doctor blade method so that the film had a thickness of 80 micrometers after drying. The film was then dried at 120° C. for 20 minutes. The film was then pressed using a roll press so that the resulting electrode layer had the density shown in Table 1 to obtain an electrode (negative electrode).

The crack rate of the electrode was evaluated in the same manner as in the section "5.1.5. Production and evaluation of electrode". The results are shown in Table 1.

5.4.6. Production and Evaluation of Electrical Storage Device

<Production of Counter Electrode (Positive Electrode)>

A twin-screw planetary mixer ("TK HIVIS MIX 2P-03" manufactured by PRIMIX Corporation) was charged with 4.0 parts by mass (solid content) of an electrochemical device electrode binder ("KF Polymer #1120" manufactured by Kureha Corporation), 3.0 parts by mass of a conductive aid ("DENKA BLACK" 50% pressed product, manufactured by Denki Kagaku Kohyo Kabushiki Kaisha), 100 parts by mass of LiCoO$_2$ (particle size: 5 micrometers, manufactured by Hayashi Kasei Co., Ltd.) (positive electrode active material), and 36 parts by mass of N-methylpyrrolidone (NMP). The mixture was stirred at 60 rpm for 2 hours to prepare a paste. After the addition of NMP to the paste to adjust the solid content to 65%, the mixture was stirred at 200 rpm for 2 minutes, stirred at 1800 rpm for 5 minutes, and stirred at 1800 rpm for 1.5 minutes under vacuum using a stirrer/deaerator ("THINKY Mixer (*Awatori Rentarou*)" manufactured by THINKY Corporation) to prepare an electrode slurry. The electrode slurry was uniformly applied to the surface of an aluminum foil collector by a doctor blade method so that the film had a thickness of 80 micrometers after drying. The film was then dried at 120° C. for 20 minutes. The film was then pressed using a roll press so that the resulting electrode layer had a density of 3.0 g/cm$^3$ to obtain a counter electrode (positive electrode).

<Assembly of Lithium-Ion Battery Cell>

In a gloved box of which the inner atmosphere was substituted with argon (Ar) so that the dew point was −80° C., a negative electrode (diameter: 16.16 mm) prepared by punching the negative electrode produced in the section "5.3.5 Production and evaluation of electrode" was placed on a two-electrode coin cell ("HS Flat Cell" manufactured by Hohsen Corp.). A separator ("Celgard #2400" manufactured by Celgard, LLC.) (diameter: 24 mm) prepared by punching a polypropylene porous membrane was placed on the negative electrode, and 500 microliters of an electrolyte was injected into the two-electrode coin cell while avoiding entrance of air. A positive electrode (diameter: 15.95 mm) prepared by punching the positive electrode produced in the section "Production of counter electrode (positive electrode)" was placed on the separator, and the outer casing of the two-electrode coin cell was air-tightly secured using a screw to assemble a lithium-ion battery cell (electrical storage device). Note that the electrolyte was prepared by dissolving LiPF$_6$ in ethylene carbonate/ethylmethyl carbonate (mass ratio=1/1) at a concentration of 1 mol/l.

The charge-discharge rate characteristics of the electrical storage device were evaluated in the same manner as in the section "5.1.6. Preparation and evaluation of electrical storage device". The results are shown in Table 1.

5.5. Examples 7 to 8 and Comparative Examples 4 to 5

An aqueous dispersion containing particles of a polymer (A) having the composition shown in Table 1 was prepared in the same manner as in the section "5.4.1. Production of polymer (A)" in Example 6, except for changing the monomer composition and the amount of the emulsifier as shown in Table 2. Water was removed under reduced pressure or added depending on the solid content of the aqueous dispersion to obtain an aqueous dispersion having a solid content of 40%.

An electrode binder composition was prepared in the same manner as in the section "5.4.2. Preparation of electrode binder composition" in Example 6, except for changing the type and the amount of the component (B) as shown in Table 1. The storage stability of the electrode binder composition was evaluated in the same manner as in the section "5.4.3. Evaluation of storage stability of electrode binder composition" in Example 6. The results are shown in Table 1.

An electrode slurry was prepared and evaluated in the same manner as in the section "5.4.4. Preparation and evaluation of electrode slurry" in Example 6, an electrode was produced and evaluated in the same manner as in the section "5.4.5. Production and evaluation of electrode" in Example 6, and an electrical storage device was produced and evaluated in the same manner as in the section "5.4.6. Production and evaluation of electrical storage device" in Example 6. The results are shown in Table 1.

5.6. Evaluation Results

The electrode binder compositions of Examples 1 to 8 and Comparative Examples 1 to 5 and the evaluation results are shown in Table 1.

TABLE 1

| | | Example 1 | Example 2 | Example 3 | Example 4 | Example 5 | Comparative Example 1 | Comparative Example 2 |
|---|---|---|---|---|---|---|---|---|
| Component (A) | VDF (parts) | 21 | 20 | 24 | 21 | 21 | 21 | 20 |
| | HFP (parts) | 4 | 5 | 1 | 4 | 4 | 4 | 5 |
| | MMA (parts) | 30 | 30 | 30 | 30 | 30 | 30 | 30 |
| | EHA (parts) | 40 | 40 | 40 | 40 | 40 | 40 | 40 |
| | HEMA (parts) | — | — | — | — | — | — | — |
| | MAA (parts) | 5 | — | 5 | 5 | 5 | 5 | — |
| | AA (parts) | — | 5 | — | — | — | — | 5 |
| | TA (parts) | — | — | — | — | — | — | — |
| | AN (parts) | — | — | — | — | — | — | — |
| | BD (parts) | — | — | — | — | — | — | — |
| | ST (parts) | — | — | — | — | — | — | — |
| Component (B) | AA (ppm) | — | 50 | — | — | — | 10 | 1200 |
| | TA (ppm) | — | — | — | 700 | — | — | — |
| | Acetic acid (ppm) | 300 | — | — | — | 300 | — | — |
| | Sodium acetate (ppm) | — | — | 500 | — | — | — | — |
| | Nitric acid (ppm) | — | — | — | — | — | — | — |
| Component (C) | | Water | Water | Water | Water | Water | Water | Water |
| Properties of polymer | Numerical average particle size (nm) | 330 | 210 | 330 | 330 | 330 | 330 | 330 |
| | THF insoluble content (%) | 85 | 95 | 95 | 85 | 85 | 85 | 85 |
| | Tg (° C.) | −5 | −5 | 1 | −5 | −5 | −5 | −5 |
| Storage stability of binder composition | Precipitation | Acceptable | Acceptable | Acceptable | Acceptable | Acceptable | Unacceptable | Acceptable |
| | Freezing temperature (° C.) | −0.7 | −0.5 | −0.7 | −0.8 | −0.6 | −0.1 | −0.9 |
| Properties of slurry | Spinnability (%) | 68 | 52 | 75 | 73 | 61 | 45 | 15 |
| Properties of electrode | Density of active material layer (g/cm$^3$) | 1.6 | 1.8 | 2.4 | 1.7 | 2 | 1.6 | 1.8 |
| | Crack rate (%) | 15 | 1 | 7 | 10 | 9 | 15 | 1 |
| Properties of electrical storage device | Charge rate (%) | 89 | 90 | 86 | 88 | 94 | 52 | 63 |
| | Discharge rate (%) | 87 | 88 | 84 | 86 | 95 | 51 | 62 |

| | | Comparative Example 3 | Example 6 | Example 7 | Example 8 | Comparative Example 4 | Comparative Example 5 |
|---|---|---|---|---|---|---|---|
| Component (A) | VDF (parts) | 24 | — | — | — | — | — |
| | HFP (parts) | 1 | — | — | — | — | — |
| | MMA (parts) | 30 | 12 | 12 | 12 | 12 | 12 |
| | EHA (parts) | 40 | — | — | — | — | — |
| | HEMA (parts) | — | — | — | 3 | — | 3 |
| | MAA (parts) | 5 | — | — | — | — | — |
| | AA (parts) | — | 1 | 1 | 1 | 1 | 1 |
| | TA (parts) | — | 3 | 3 | 3 | 3 | 3 |
| | AN (parts) | — | 12 | 12 | 12 | 12 | 12 |
| | BD (parts) | — | 49 | 49 | 49 | 49 | 49 |
| | ST (parts) | — | 23 | 23 | 20 | 23 | 20 |
| Component (B) | AA (ppm) | — | — | — | — | — | — |
| | TA (ppm) | — | 500 | — | — | 10 | 1100 |
| | Acetic acid (ppm) | — | — | 200 | — | — | — |
| | Sodium acetate (ppm) | — | — | — | 800 | — | — |
| | Nitric acid (ppm) | 300 | — | — | — | — | — |
| Component (C) | | Water | Water | Water | Water | Water | Water |
| Properties of polymer | Numerical average particle size (nm) | 330 | 200 | 90 | 120 | 200 | 90 |
| | THF insoluble content (%) | 85 | 90 | 90 | 90 | 90 | 91 |
| | Tg (° C.) | −5 | −20 | −20 | −20 | −20 | −21 |
| Storage stability of binder composition | Precipitation | Unacceptable | Acceptable | Acceptable | Acceptable | Unacceptable | Acceptable |
| | Freezing temperature (° C.) | −0.7 | −0.7 | −0.6 | −0.8 | −0.1 | −0.8 |
| Properties of slurry | Spinnability (%) | 58 | 72 | 60 | 75 | 70 | 17 |
| Properties of electrode | Density of active material layer (g/cm$^3$) | 2.4 | 1.5 | 1.5 | 1.5 | 1.5 | 1.5 |
| | Crack rate (%) | 7 | 0 | 1 | 1 | 0 | 1 |
| Properties of electrical storage device | Charge rate (%) | 43 | 90 | 88 | 89 | 48 | 64 |
| | Discharge rate (%) | 44 | 91 | 87 | 88 | 49 | 62 |

TABLE 2

|  |  | Example 5 | Example 6 | Example 7 | Comparative Example 4 | Comparative Example 5 |
|---|---|---|---|---|---|---|
| First-stage polymerization component | AN (parts) | 0.0 | 0.0 | 0.0 | 0.0 | 0.0 |
|  | HEMA (parts) | 0.0 | 0.0 | 0.0 | 0.0 | 0.0 |
|  | BD (parts) | 6.7 | 6.7 | 6.7 | 6.7 | 6.7 |
|  | ST (parts) | 12.0 | 12.0 | 12.0 | 12.0 | 12.0 |
|  | MMA (parts) | 2.6 | 2.6 | 2.6 | 2.6 | 2.6 |
|  | AA (parts) | 0.59 | 0.59 | 0.59 | 0.59 | 0.59 |
|  | TA (parts) | 2.35 | 2.35 | 2.35 | 2.35 | 2.35 |
| Total |  | 24.2 | 24.2 | 24.2 | 24.2 | 24.2 |
| Second-stage polymerization component | AN (parts) | 12.0 | 12.0 | 12.0 | 12.0 | 12.0 |
|  | HEMA (parts) | 0.0 | 0.0 | 3.0 | 0.0 | 3.0 |
|  | BD (parts) | 42.3 | 42.3 | 42.3 | 42.3 | 42.3 |
|  | ST (parts) | 11.0 | 11.0 | 8.0 | 11.0 | 8.0 |
|  | MMA (parts) | 9.6 | 9.6 | 9.6 | 9.6 | 9.6 |
|  | AA (parts) | 0.36 | 0.36 | 0.36 | 0.36 | 0.36 |
|  | TA (parts) | 0.50 | 0.50 | 0.50 | 0.50 | 0.50 |
| Total |  | 75.8 | 75.8 | 75.8 | 75.8 | 75.8 |
| Total of first-stage and second-stage polymerization components | AN (parts) | 12.0 | 12.0 | 12.0 | 12.0 | 12.0 |
|  | HEMA (parts) | 0 | 0 | 3.0 | 0.0 | 3.0 |
|  | BD (parts) | 49.0 | 49.0 | 49.0 | 49.0 | 49.0 |
|  | ST (parts) | 23.0 | 23.0 | 20.0 | 23.0 | 20.0 |
|  | MMA (parts) | 12.2 | 12.2 | 12.2 | 12.2 | 12.2 |
|  | AA (parts) | 0.95 | 0.95 | 0.95 | 0.95 | 0.95 |
|  | TA (parts) | 2.85 | 2.85 | 2.85 | 2.85 | 2.85 |
| Total |  | 100.0 | 100.0 | 100.0 | 100.0 | 100.0 |

The abbreviations of each component shown in Tables 1 and 2 have the following meanings.
VDF: vinylidene fluoride
HFP: hexafluoropropylene
MMA: methyl methacrylate
EHA: 2-eththylhexyl acrylate
HEMA: 2-hydroxyethyl methacrylate
MAA: methacrylic acid
AA: acrylic acid
TA: itaconic acid
AN: acrylonitrile
BD: 1,3-butadiene
ST: styrene As is clear from Table 1, the electrode binder compositions of Examples 1 to 8 exhibited excellent storage stability. The electrode slurry prepared using the electrode binder compositions of Examples 1 to 8 exhibited excellent adhesion between the collector and the electrode active material layer, and produced an electrode that had a low crack rate and exhibited excellent adhesion. The electrical storage device (lithium-ion battery) including the electrode exhibited excellent charge-discharge rate characteristics.

On the other hand, the binder compositions of Comparative Examples 1 to 5 could not produce an excellent electrode, and could not produce an electrical storage device exhibiting excellent charge-discharge rate characteristics.

It is considered that the particles of the polymer (A) used in Examples 1 to 5 and Comparative Examples 1 to 3 were polymer alloy particles based on the DSC chart.

FIG. 1 illustrates the DSC chart of the polymer (A) produced in Example 3. Since the polymer particles of Example 3 were multi-stage polymerized by adding the monomer to the seed particles, it is considered that the polymer particles of Example 3 were polymer particles containing at least two kinds of polymers. As is clear from FIG. 1, the polymer particles of Example 3 had only one Tg instead of two Tg derived from the two kinds of polymers. This suggests that the polymer particles produced in Example 3 were polymer alloy particles.

The invention is not limited to the above embodiments. Various modifications and variations may be made. The invention includes various other configurations substantially the same as the configurations described in connection with the embodiments (such as a configuration having the same function, method, and results, or a configuration having the same objective and results). The invention also includes configurations in which an unsubstantial portion described in the embodiments is replaced. The invention also includes a configuration having the same effects as those of the configurations described in connection with the above embodiments, or a configuration capable of achieving the same objective as that of the configurations described in connection with the above embodiments. The invention also includes a configuration in which a known technique is added to the configurations described in connection with the above embodiments.

What is claimed is:

1. An electrical storage device electrode binder composition comprising (A) a polymer, (B) a carboxylic acid or a salt thereof, and (C) a liquid medium, the polymer (A) being diene polymer particles that comprise (a) a repeating unit derived from a conjugated diene compound, (b) a repeating unit derived from an aromatic vinyl compound, (c) a repeating unit derived from a (meth)acrylate compound, and (d) a repeating unit derived from an unsaturated carboxylic acid, and the binder composition having a concentration of the carboxylic acid or a salt thereof (B) of 20 to 1000 ppm,
   wherein the carboxylic acid or a salt thereof (B) is selected from the group consisting of acrylic acid, methacrylic acid, crotonic acid, maleic acid, fumaric acid, itaconic acid, malonic acid, citric acid, acetic acid, and salts thereof, and
   wherein the electrical storage device electrode binder composition is free of a fluoropolymer.

2. The electrical storage device electrode binder composition according to claim 1, wherein the diene polymer particles have only one endothermic peak within a temperature range of −50 to +5° C. when subjected differential scanning calorimetry (DSC) in accordance with JIS K 7121.

3. The electrical storage device electrode binder composition according to claim 1, wherein the diene polymer particles have a number average particle size of 50 to 400 nm.

4. An electrical storage device electrode slurry comprising the electrical storage device electrode binder composition according to claim 1, and an electrode active material.

5. An electrical storage device electrode comprising a collector, and a layer that is formed by applying the electrical storage device electrode slurry according to claim 4 to a surface of the collector, and drying the slurry.

6. An electrical storage device comprising the electrical storage device electrode according to claim 5.

7. The electrical storage device electrode binder composition according to claim 1, wherein the carboxylic acid or a salt thereof (B) is selected from the group consisting of acrylic acid, methacrylic acid, and salts thereof.

8. The electrical storage device electrode binder composition according to claim 1, wherein the conjugated diene compound comprises at least one member selected from the group consisting of 1,3-butadiene, 2-methyl-1,3-butadiene, 2,3-dimethyl-1,3-butadiene, 2-chloro-1,3-butadiene.

9. The electrical storage device electrode binder composition according to claim 1, wherein the conjugated diene compound is 1,3-butadiene.

10. The electrical storage device electrode binder composition according to claim 1, wherein the aromatic vinyl compound comprises at least one member selected from the group consisting of styrene, alpha-methylstyrene, p-methylstyrene, vinyltoluene, chlorostyrene, divinylbenzene.

11. The electrical storage device electrode binder composition according to claim 1, wherein the aromatic vinyl compound is styrene.

12. The electrical storage device electrode binder composition according to claim 1, wherein the (meth)acrylate compound comprises at least one member selected from the group consisting of methyl (meth)acrylate, ethyl (meth)acrylate, n-propyl (meth)acrylate, i-propyl (meth)acrylate, n-butyl (meth)acrylate, butyl (meth)acrylate, n-amyl (meth)acrylate, i-amyl (meth)acrylate, hexyl (meth)acrylate, cyclohexyl (meth)acrylate, 2-ethylhexyl (meth)acrylate, n-octyl (meth)acrylate, nonyl (meth)acrylate, decyl (meth)acrylate, hydroxymethyl (meth)acrylate, hydroxyethyl (meth)acrylate, ethylene glycol (meth)acrylate, ethylene glycol di(meth)acrylate, propylene glycol di(meth)acrylate, tri(meth)acrylate, pentaerythritol tetra(meth)acrylate, dipentaerythritol hexa(meth)acrylate, allyl (meth)acrylate, and ethylene di(meth)acrylate.

13. The electrical storage device electrode binder composition according to claim 1, wherein the (meth)acrylate compound comprises at least one member selected from the group consisting of methyl (meth)acrylate, ethyl (meth)acrylate, and 2-ethylhexyl (meth)acrylate.

14. The electrical storage device electrode binder composition according to claim 1, wherein the (meth)acrylate compound is methyl (meth)acrylate.

15. The electrical storage device electrode binder composition according to claim 1, which has a concentration of the carboxylic acid or a salt thereof (B) of 50 to 900 ppm.

16. The electrical storage device electrode binder composition according to claim 1, which has a concentration of the carboxylic acid or a salt thereof (B) of 100 to 800 ppm.

17. The electrical storage device electrode binder composition according to claim 1, wherein the liquid medium (C) is an aqueous medium.

18. The electrical storage device electrode binder composition according to claim 1, wherein the liquid medium (C) comprises at least one component selected from the group consisting of amide compounds, hydrocarbons, alcohols, ketones, esters, amine compounds, lactones, sulfoxides, and sulfone compounds.

19. The electrical storage device electrode binder composition according to claim 1, wherein the liquid medium (C) has a water content of at least 90 mass %.

20. The electrical storage device electrode binder composition according to claim 1, wherein the carboxylic acid or a salt thereof (B) comprises at least one of acrylic acid, itaconic acid and salts thereof.

* * * * *

UNITED STATES PATENT AND TRADEMARK OFFICE
CERTIFICATE OF CORRECTION

PATENT NO. : 9,520,242 B2
APPLICATION NO. : 14/679431
DATED : December 13, 2016
INVENTOR(S) : Hironori Kitaguchi et al.

It is certified that error appears in the above-identified patent and that said Letters Patent is hereby corrected as shown below:

Column 38, Line 2, "butyl" should read -- i-butyl --.

Column 38, Lines 8/9, "tri(meth)acrylate" should read -- trimethylolpropane tri(meth)acrylate --.

Signed and Sealed this
Eighth Day of May, 2018

Andrei Iancu
*Director of the United States Patent and Trademark Office*